United States Patent
Sone

(10) Patent No.: US 10,079,514 B2
(45) Date of Patent: Sep. 18, 2018

(54) ELECTRIC POWER RECEIVING DEVICE AND NON-CONTACT POWER SUPPLY SYSTEM

(71) Applicant: Renesas Electronics Corporation, Koutou-ku, Tokyo (JP)

(72) Inventor: Yasuhiko Sone, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 15/726,355

(22) Filed: Oct. 5, 2017

(65) Prior Publication Data

US 2018/0041074 A1    Feb. 8, 2018

Related U.S. Application Data

(62) Division of application No. 14/315,886, filed on Jun. 26, 2014, now abandoned.

(30) Foreign Application Priority Data

Jul. 2, 2013    (JP) .................................. 2013-138666

(51) Int. Cl.
    *H02J 50/12*    (2016.01)
    *H02J 7/02*     (2016.01)
    *H02J 5/00*     (2016.01)

(52) U.S. Cl.
    CPC .............. *H02J 50/12* (2016.02); *H02J 5/005* (2013.01); *H02J 7/025* (2013.01)

(58) Field of Classification Search
    CPC ............. H02J 5/005; H02J 7/025; H02J 50/12
    See application file for complete search history.

(56) References Cited

U.S. PATENT DOCUMENTS 6,321,067 B1    11/2001    Suga et al.
6,427,065 B1     7/2002    Suga et al.
(Continued)

FOREIGN PATENT DOCUMENTS

CN    101453234 A    6/2009
CN    102832722 A    12/2012
(Continued)

OTHER PUBLICATIONS

Office Action dated Nov. 17, 2016 in Japanese Patent Application No. 2013-138666.
(Continued)

*Primary Examiner* — Jared Fureman
*Assistant Examiner* — Michael Warmflash
(74) *Attorney, Agent, or Firm* — Shapiro, Gabor and Rosenberger, PLLC

(57) ABSTRACT

In a non-contact power supply system, an electric power receiving device with suppressed heat generation is provided. The electric power receiving device is configured with a resonance circuit which includes a resonance capacity and a resonance coil acting as a receiving antenna, and receives electric power in a non-contact manner using resonant coupling of the resonance circuit. When receiving electric power, the electric power receiving device monitors the reception electric power received by the resonance circuit and controls the resonance frequency of the resonance circuit so as to keep the reception electric power from exceeding a target electric power level (PTGT). Accordingly, even when an electric power larger than the electric power required by the electric power receiving device is transmitted from the transmitting side, the electric power receiving device operates not to receive the electric power greater than the target electric power level.

8 Claims, 14 Drawing Sheets

(56) References Cited

U.S. PATENT DOCUMENTS

| | | | |
|---|---|---|---|
| 6,630,858 B1* | 10/2003 | Takabayashi | G05F 1/575 |
| | | | 327/538 |
| 8,260,200 B2 | 9/2012 | Shimizu et al. | |
| 8,855,554 B2 | 10/2014 | Cook et al. | |
| 2012/0306285 A1* | 12/2012 | Kim | H02J 17/00 |
| | | | 307/104 |
| 2012/0319646 A1 | 12/2012 | Kamata | |
| 2013/0257167 A1 | 10/2013 | Singh | |
| 2013/0342026 A1 | 12/2013 | Mishina et al. | |
| 2014/0145516 A1 | 5/2014 | Hirosawa et al. | |
| 2014/0306545 A1 | 10/2014 | Robertson et al. | |
| 2015/0008755 A1* | 1/2015 | Sone | H02J 5/005 |
| | | | 307/104 |

FOREIGN PATENT DOCUMENTS

| | | |
|---|---|---|
| JP | H10-145987 A | 5/1998 |
| JP | 2001-5938 A | 1/2001 |
| JP | 2012-065455 A | 3/2012 |
| JP | 2013-17256 A | 1/2013 |
| JP | 2013-21906 A | 1/2013 |
| JP | 2013-74659 A | 4/2013 |
| TW | 201251256 A1 | 12/2012 |
| WO | WO 2012/121371 A1 | 9/2012 |
| WO | WO 2013/006068 A1 | 1/2013 |
| WO | WO 2013/015416 A1 | 1/2013 |

OTHER PUBLICATIONS

Office Action dated May 23, 2017, in European Patent Application No. 14174120.7.

Extended European search report dated Dec. 22, 2014, in European Patent Application No. 14 174 120.7.

Office Action dated Dec. 5, 2017, in Taiwanese Patent Application No. 103120229.

Office Action dated Oct. 25, 2017 in Chinese Patent Application No. 201410312310.7.

Office Action dated Jun. 22, 2018, in Chinese Patent Application No. 201410312310.7.

* cited by examiner

ELECTRIC POWER RECEIVING DEVICE AND NON-CONTACT POWER SUPPLY SYSTEM

CROSS-REFERENCE TO RELATED APPLICATIONS

The disclosure of Japanese Patent Application No. 2013-138666 filed on Jul. 2, 2013 including the specification, drawings and abstract is incorporated herein by reference in its entirety.

BACKGROUND

The present invention relates to an electric power receiving device which receives electric power in a non-contact manner, and a non-contact power supply system which includes the electric power receiving device, and relates to technology which is effective when applied to an electric power receiving device with the use of resonant coupling of an electromagnetic field (magnetic resonance), for example.

Practical utilization is advancing in a system using non-contact power transmission which supplies electric power to an electrical machinery and apparatus in a non-contact manner without the intermediary of a power cord, etc. (hereinafter called a "non-contact power supply system"). For example, a non-contact power supply system of the electromagnetic induction type which utilizes electromagnetic induction between antennae (coils) arranged mutually spaced out, and a non-contact power supply system of the magnetic resonance type which utilizes resonant coupling of an electromagnetic field are known.

Patent Literature 1 discloses related art technology of a non-contact power supply system of the magnetic resonance type, for example. In the non-contact power supply system disclosed by Patent Literature 1, electric power supplied to a primary resonance circuit which is configured with a coil and a capacitor on a transmitting side is transmitted to a secondary resonance circuit on a receiving side, by electromagnetic resonant coupling. The electric power received by the secondary resonance circuit is rectified by a rectifier circuit, converted into a DC voltage by a control circuit such as an electric power reception IC (integrated circuit), and is utilized for electric charging of a battery, etc.

PATENT LITERATURE (Patent Literature 1) Published Japanese Unexamined Patent Application No. 2013-21906

SUMMARY

In an electric power receiving device, such as the above-described non-contact power supply system, which charges a battery with the use of transmitted electric power, when the transmitted electric power is insufficient, a sufficient amount of operation power supply will not be obtained in an electric power reception IC, and electric charging of a battery will stop. On the contrary, when the transmitted electric power is too large, it is likely that circuit components such as an electric power reception IC in the electric power receiving device may be destroyed. Therefore, such a non-contact power supply system performs the transmission control in the electric power transmitting device to optimize the electric power to be transmitted depending on the states of a load on the receiving side (for example, remaining amount of a battery of the electric power receiving device). Thereby, the reliability of the electric power transmission is enhanced. For example, when there is little remaining amount of a battery, the electric power to be transmitted is increased, and when there is much remaining amount of a battery, the electric power to be transmitted is decreased. Through such kinds of control, the electric power necessary for the receiving side is transmitted. However, such kinds of transmission control on the transmitting side have a high degree of difficulty. In particular, it is difficult to realize reliable transmission control in a non-contact power supply system which time-shares the transmission/reception of electric power and the communications of information.

Accordingly, in the past, in addition to the above transmission control, by providing an over-voltage protection diode (Zener diode) coupled to the output node of a rectifier circuit on the receiving side, comparatively larger electric power has been transmitted from the transmitting side. According to this method, it is possible to prevent occurrence of a case where, when the load is large (for example, there is little remaining amount of a battery), sufficient operation power supply for the electric power reception IC is not obtained, stopping the charging operation of a battery. Furthermore, even when the load is small (for example, there is much remaining amount of a battery) and the electric power transmission becomes excessive, it is possible to prevent destruction of the electric power reception IC, since the upper limit of a voltage applied to the electric power reception IC is decided by the over-protection diode.

On the other hand, electric power receiving devices, such as a mobile-phone and Smartphone, restrict a terminal's own heating value by specifying the upper limit of consumed electric power in product specifications. However, when an over-voltage protection diode is provided in an electric power receiving device as described above, much electric power is consumed in the over-voltage protection diode at the time of excessive electric power transmission. Therefore, it is difficult to ignore the heating value of the over-voltage protection diode. In the electric power reception IC, the output voltage of a rectifier circuit is stepped down to a desired target voltage with the use of a DC-DC converter such as a series regulator or a switching regulator. Therefore, when an over-voltage protection diode is coupled to the output node of the rectifier circuit as described above, the difference of the output voltage of the rectifier circuit and the target voltage becomes large at the time of excessive electric power transmission; therefore, the problem in the DC-DC converter is the increase in heating value and the degradation in the conversion efficiency of electric power.

Solutions to such problems will be explained in the following. The other issues and new features of the present invention will become clear from the description of the present specification and the accompanying drawings.

The following explains briefly an outline of typical embodiments to be disclosed by the present application.

That is, an electric power receiving device according to the present invention is configured with a resonance circuit which includes a resonance capacitor and a resonance coil acting as a receiving antenna, and the electric power receiving device receives electric power in a non-contact manner with the use of resonant coupling of the resonance circuit. The electric power receiving device, when receiving the electric power, monitors the reception electric power received by the resonance circuit and controls a resonance frequency of the resonance circuit so as to keep the reception electric power from exceeding a target electric power level.

The following explains briefly an effect obtained by the typical embodiments to be disclosed in the present application.

That is, it is possible to suppress the heat generation of the electric power receiving device in a non-contact power supply system.

DETAILED DESCRIPTION

1. Outline of Embodiments

Figure 1:
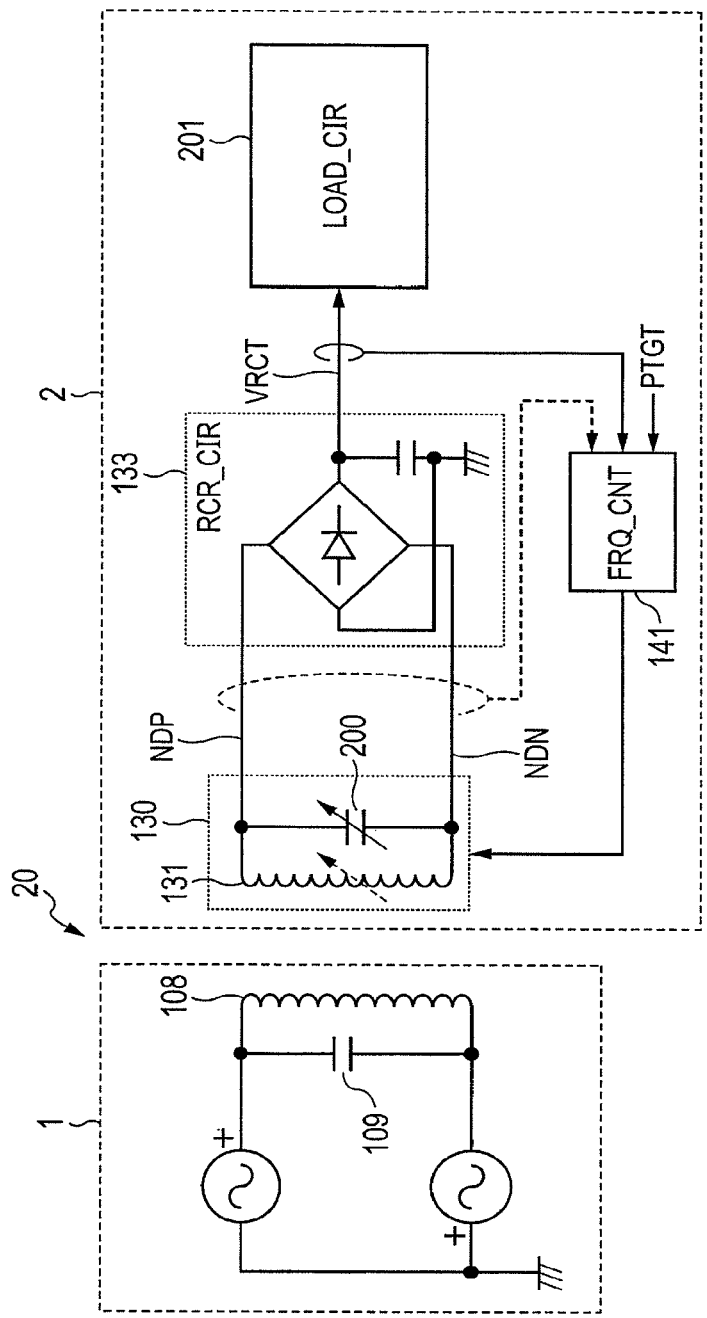
FIG. 1 is a drawing illustrating an electric power receiving device according to Embodiment 1 of the present application.

First, an outline of a typical embodiment of the invention disclosed in the present application is explained. A numerical symbol of the drawing referred to in parentheses in the outline explanation about the typical embodiment only illustrates what is included in the concept of the component to which the numerical symbol is attached.

<1> (an Electric Power Receiving Device which Adjusts a Resonance Frequency so as to Keep Reception Electric Power from Exceeding a Prescribed Electric Power Level)

As illustrated in FIG. 1, the electric power receiving device (2) according to the typical embodiment of the present application is configured with a resonance circuit (130) which includes a resonance capacitor (200) and a resonance coil (131) acting as a receiving antenna. The electric power receiving device (2) receives electric power in a non-contact manner with the use of resonant coupling of the resonance circuit. The electric power receiving device, when receiving the electric power, monitors the reception electric power received by the resonance circuit and controls a resonance frequency of the resonance circuit so as to keep the reception electric power from exceeding a target electric power level (PTGT).

According to this configuration, even when an electric power larger than the electric power required by the receiving side is transmitted from the transmitting side, the electric power receiving device operates not to receive the electric power greater than the target electric power level. Accordingly, the electric power receiving device does not receive the excessive electric power more than required; therefore it is possible to suppress the heat generation in the electric power receiving device.

<2> (Depending on the Level of the Reception Electric Power, Coincidence/Non-Coincidence of a Resonance Frequency and an Electric Power Transmission Frequency are Controlled)

In the electric power receiving device (2) according to Paragraph 1, when the reception electric power is not exceeding the target electric power level (PTGT), the impedance of the resonance circuit is adjusted so as to match the resonance frequency of the resonance circuit with an electric power transmission frequency (fTx), and when the reception electric power is exceeding the target electric power level, the impedance of the resonance circuit is adjusted so as to shift the resonance frequency away from the electric power transmission frequency.

With this configuration, when the electric power larger than the electric power required by the receiving side (the target electric power level) is transmitted from the transmitting side, the resonance frequency of the receiving side departs from the electric power transmission frequency, reducing the reception electric power of the electric power receiving device. When the electric power smaller than the target electric power level is transmitted, the resonance frequency of the receiving side approaches the electric power transmission frequency, increasing the reception electric power of the electric power receiving device. Accordingly, it is possible to easily realize the control under which the electric power receiving device does not receive the electric power more than required.

<3> (Monitoring of an Output Voltage of a Rectifier Circuit)

The electric power receiving device (2, 4-8, 11, 12) according to Paragraph 1 or Paragraph 2 is configured further with a rectifier circuit (133) which rectifies an AC voltage corresponding to the electric power received by the resonance circuit (130, 130A-130E) and outputs a DC output voltage, and an adjustment unit (141) which monitors the output voltage (VRCT) of the rectifier circuit and adjusts impedance of the resonance circuit to keep the output voltage from exceeding a target voltage (VTGT).

According to this configuration, it is possible to control the resonance frequency of the resonance circuit, with ease and a high degree of accuracy. When the output voltage of a rectifier circuit is stepped down to a desired voltage by providing a DC-DC converter such as a series regulator or a switching regulator in the latter stage of the rectifier circuit, for example, the present electric power receiving device can reduce the input-output potential difference of the DC-DC converter. Accordingly, it is possible to improve the voltage conversion efficiency of the DC-DC converter, and to suppress the heat generation in the DC-DC converter.

<4> (A Variable Resonance Capacitor)

In the electric power receiving device (2, 4-7, 11, 12) according to Paragraph 3, the capacitance value of the resonance circuit is changed by the adjustment unit.

According to this configuration, it becomes easy to change the impedance of the resonance circuit.

<5> (Linear Control by Means of an AMP, Adjustment of One of the Positive Side and the Negative Side of a Resonance Circuit)

In the electric power receiving device (2, 4) according to Paragraph 4, the adjustment unit includes a differential amplifier circuit (AMP) which generates a control voltage (144) so as to reduce a difference of the target voltage and the output voltage. The resonance circuit includes a parallel resonance unit (202) configured with a resonance coil (131) and a resonance capacitor (132) coupled in parallel, and a first capacitor (CP) and a first variable resistance circuit (M1) coupled in series between one end of the parallel resonance unit and a reference node (ground node) supplied with a fixed voltage. The first variable resistance circuit changes a value of resistance based on the control voltage.

According to this configuration, by linearly controlling the resonance frequency of the resonance circuit, it is possible to control to keep the output voltage of the rectifier circuit from exceeding the target voltage. It is also possible to realize the resonance circuit which can adjust the resonance frequency, with a small number of components.

<6> (Adjustment of Both the Positive Side and the Negative Side of the Resonance Circuit)

In the electric power receiving device (2) according to Paragraph 5, the resonance circuit further includes a second capacitor (CN) and a second variable resistance circuit (M2) coupled in series between the other end of the parallel resonance unit and the reference node. The second variable resistance circuit changes a value of resistance based on the control voltage.

According to this configuration, a circuit for impedance adjustments, which is configured with the capacitor and the variable resistance circuit coupled in series, is coupled to each of the positive side terminal and the negative side terminal of the parallel resonance unit. Therefore, it is possible to maintain the symmetry of the signal waveform of AC signals corresponding to the reception electric power generated at each terminal of the parallel resonance unit.

<7> (A Switching Element Configured with a Transistor)

In the electric power receiving device according to Paragraph 3 or Paragraph 4, the first variable resistance circuit and the second variable resistance circuit are configured respectively with a transistor (M1, M2) driven by the control voltage.

According to this configuration, it is possible to realize the first variable resistance circuit and the second variable resistance circuit with a simple configuration.

<8> (Switching Control by Means of a CMP)

In the electric power receiving device (5, 6) according to Paragraph 4, the adjustment unit includes a comparator circuit (150) which compares a threshold voltage (VTGT) corresponding to the target voltage and the output voltage, to output the comparison result (149). The resonance circuit includes a parallel resonance unit (202) configured with the resonance coil and the resonance capacitor coupled in parallel, and a first capacitor (CP) and a first switching element (SW1) coupled in series between one end of the parallel resonance unit and a reference node (ground node) supplied with a fixed voltage. The first switching element is on-off controlled, on the basis of the comparison result.

According to this configuration, by switching the resonance frequency of the resonance circuit in binary, it is possible to control to keep the output voltage of the rectifier circuit from exceeding the target voltage, and accordingly, it becomes easy to restrict the reception electric power of the electric power receiving device. It is also possible to realize the resonance circuit which can adjust the resonance frequency, with a small number of components.

<9> (Switching Control; Adjustment of Both the Positive Side and the Negative Side of the Resonance Circuit)

In the electric power receiving device (5) according to Paragraph 8, the resonance circuit further includes a second capacitor (CN) and a second switching element (SW2) coupled in series between the other end of the parallel resonance unit and the reference node. The second switching element is on-off controlled on the basis of the comparison result.

According to this configuration, a circuit for impedance adjustments, which is configured with the capacitor and the switching element coupled in series, is coupled to each of the positive side terminal and the negative side terminal of the parallel resonance unit. Therefore, it is possible to maintain the symmetry of the signal waveform of AC signals corresponding to the reception electric power generated at each terminal of the parallel resonance unit.

<10> (Coincidence and Non-Coincidence of the Resonance Frequency and the Electric Power Transmission Frequency are Controlled Depending on Whether the Target Voltage is Exceeded)

In the electric power receiving device according to Paragraph 9, the constants of the receiving coil and the resonance capacitor of the parallel resonance unit are set up so as to match the resonance frequency of the parallel resonance unit with the electric power transmission frequency (fTx), when the first switching element and the second switching element are set to OFF. The adjustment unit sets the first switching element and the second switching element to ON when the output voltage is exceeding the target voltage and sets the first switching element and the second switching element to OFF when the output voltage is not exceeding the target voltage.

According to this configuration, it is possible to control not to receive the electric power when the output voltage is exceeding the target voltage, and to receive the electric power efficiently when the output voltage is not exceeding the target voltage.

<11> (Plural CMPs Corresponding to Plural Threshold Voltages and Corresponding Plural Variable Capacities)

In the electric power receiving device (6) according to Paragraph 4, the adjustment unit includes plural comparator circuits (150_1-150_n) each of which compares a threshold voltage (VTGT) corresponding to the target voltage and the output voltage, to output the comparison result (149). The resonance circuit includes a parallel resonance unit (202) configured with the resonance coil and the resonance capacitor coupled in parallel, and plural impedance adjustment circuits configured with a first capacitor (CN_1 (CN_2-CN_n)) and a first switching element (SW_1 (SW_2-SW_n)) coupled in series between one end of the parallel resonance unit and the reference node (ground node) supplied with a fixed voltage. Each of the plural comparator circuits has mutually different threshold voltage (VTGT1–VTGTn). The plural impedance adjustment circuits are provided corresponding to the plural comparator circuits, and the first switching element of each of the impedance adjustment circuits is on-off controlled, on the basis of the comparison result of the corresponding comparator circuit.

According to this configuration, by switching the impedance of the resonance circuit stepwise corresponding to the voltage level of the output voltage of the rectifier circuit, it is possible to change the resonance frequency stepwise. Therefore, it is possible to perform the control of the reception state in a manner similar to the analog control (linear control). Accordingly, compared with the control in which state transition is made between the reception enabled state and the reception disenabled state, it is possible to reduce an EMI noise (Electro-Magnetic Interference noise).

<12> (A Switching Element Configured with a Mechanical Switch)

In the electric power receiving device according to Paragraph 10 or Paragraph 11, the first switching element and the second switching element are mechanical switches (SW1, SW2, SW_1-SW_n) which are controlled on the basis of the control voltage.

According to this configuration, parasitic capacitance of the switching element can be made small; accordingly, it is possible to further alleviate the influence on the resonance circuit according to the fact that the first capacitor and the second capacitor are coupled, when the switching element is set to OFF.

<13> (A Variable Target Voltage)

The electric power receiving device (11) according to one of Paragraph 1 through Paragraph 12 is configured further with a load circuit (139, 135, BAT), and a voltage control unit (171) which receives the output voltage (VRCT) of the rectifier circuit and supplies it to the load circuit coupled in the latter stage. The voltage control unit adjusts the target voltage so as to match the voltage to be supplied to the load circuit with a desired voltage.

According to this configuration, the output voltage of the rectifier circuit is adjusted, depending on the voltage level to be supplied to the load. Accordingly, it is possible to generate a voltage necessary for the load, even if a DC-DC converter such as a regulator is not provided in the latter stage of the rectifier circuit. Therefore, if the requirement specification of the electric power receiving device is satisfied, it is possible to remove the existing DC-DC converter etc., contributing to the reduction of the circuit scale of the electric power receiving device.

<14> (A Variable Resonance Capacitor by a PIN Diode)

In the electric power receiving device (7) according to Paragraph 4, the resonance circuit (130D) includes a PIN diode (DPN) to which a variable bias voltage is applied by the adjustment unit.

According to this configuration, it is possible to change easily the capacitance value of the resonance circuit.

<15> (A Variable Resonance Coil)

In the electric power receiving device (8) according to Paragraph 3, the resonance circuit (130E) changes the inductance of the receiving coil (131).

According to this configuration, it becomes easy to change the impedance of the resonance circuit.

<16> (Monitoring of an Input Voltage of a Rectifier Circuit)

The electric power receiving device (9, 10) according to Paragraph 3 further includes a rectifier circuit (133) which rectifies an AC voltage corresponding to the electric power received by the resonance circuit (130) and outputs a DC output voltage, and an input voltage detection unit (160, 164) which detects the input voltage supplied to the rectifier circuit via the resonance circuit. The electric power receiving device further includes an adjustment unit (141) which adjusts the impedance of the resonance circuit to keep the input voltage detected by the input voltage detection unit from exceeding a target voltage.

According to this configuration, it is possible to control the resonance frequency of the resonance circuit so as not to receive an electric power greater than the target electric power level. Since the reception electric power is detected in earlier stage than the rectifier circuit, it is possible to improve the responsiveness of the control system.

<17> (the Input Voltage of Both the Positive Side and the Negative Side of the Rectifier Circuit is Detected)

In the electric power receiving device (9) according to Paragraph 16, the rectifier circuit is a full wave rectifier circuit. The input voltage detection unit (160) includes a first peak hold circuit (161) which detects a peak value of a positive side input voltage of the rectifier circuit, and a second peak hold circuit (162) which detects a peak value of a negative side input voltage of the rectifier circuit. The input voltage detection unit further includes an averaging circuit (163) which outputs an average value of the peak value detected by the first peak hold circuit and the peak value detected by the second peak hold circuit. The adjustment unit adjusts the impedance of the resonance circuit to keep the average value (VPA) of the averaging circuit from exceeding the target voltage (VTGT).

According to this configuration, even when the voltage waveforms inputted into the positive side and the negative side of the rectifier circuit are asymmetrical, it is possible to control the impedance of the resonance circuit with a high degree of accuracy.

<18> (A Non-Contact Power Supply System)

The non-contact power supply system (20-29) according to the typical embodiment of the present application is configured with an electric power transmitting device (1, 3) which transmits electric power in a non-contact manner with the use of the electromagnetic resonant coupling utilizing the resonance circuit, and the electric power receiving device (2, 4-12) according to one of Paragraph 1 through Paragraph 17 which receives the electric power transmitted by the electric power transmitting device in a non-contact manner.

According to this configuration, it is possible to realize a reliable non-contact power supply system, suppressing the complexity of the transmission control in the electric power transmitting device.

<19> (An Electric Power Receiving Device which Controls the Impedance of a Resonance Circuit to Match the Reception Electric Power with the Target Electric Power)

Another electric power receiving device (2, 4-12) according to the typical embodiment of the present application includes a resonance circuit (130, 130A-130E) configured with a resonance capacitor and a resonance coil acting as a receiving antenna, and receives electric power in a non-contact manner with the use of resonant coupling of the resonance circuit. When receiving the electric power, the electric power receiving device according to the present invention controls dynamically the impedance of the resonance circuit to match the reception electric power received by the resonance circuit with a target electric power level (PTGT).

According to this configuration, even when an electric power larger than the electric power required by the receiving side is transmitted from the transmitting side, the electric power receiving device operates so as to match the reception electric power with the target electric power level. Accordingly, the electric power receiving device does not receive the excessive electric power more than required; therefore, it is possible to suppress the heat generation in the electric power receiving device.

2. Details of Embodiments

The embodiments are further explained in full detail. In the entire diagrams for explaining the embodiments of the present invention, the same symbol is attached to an element which possesses the same function, and the repeated explanation thereof is omitted.

Embodiment 1

<The Outline of a Non-Contact Power Supply System>

Figure 2:
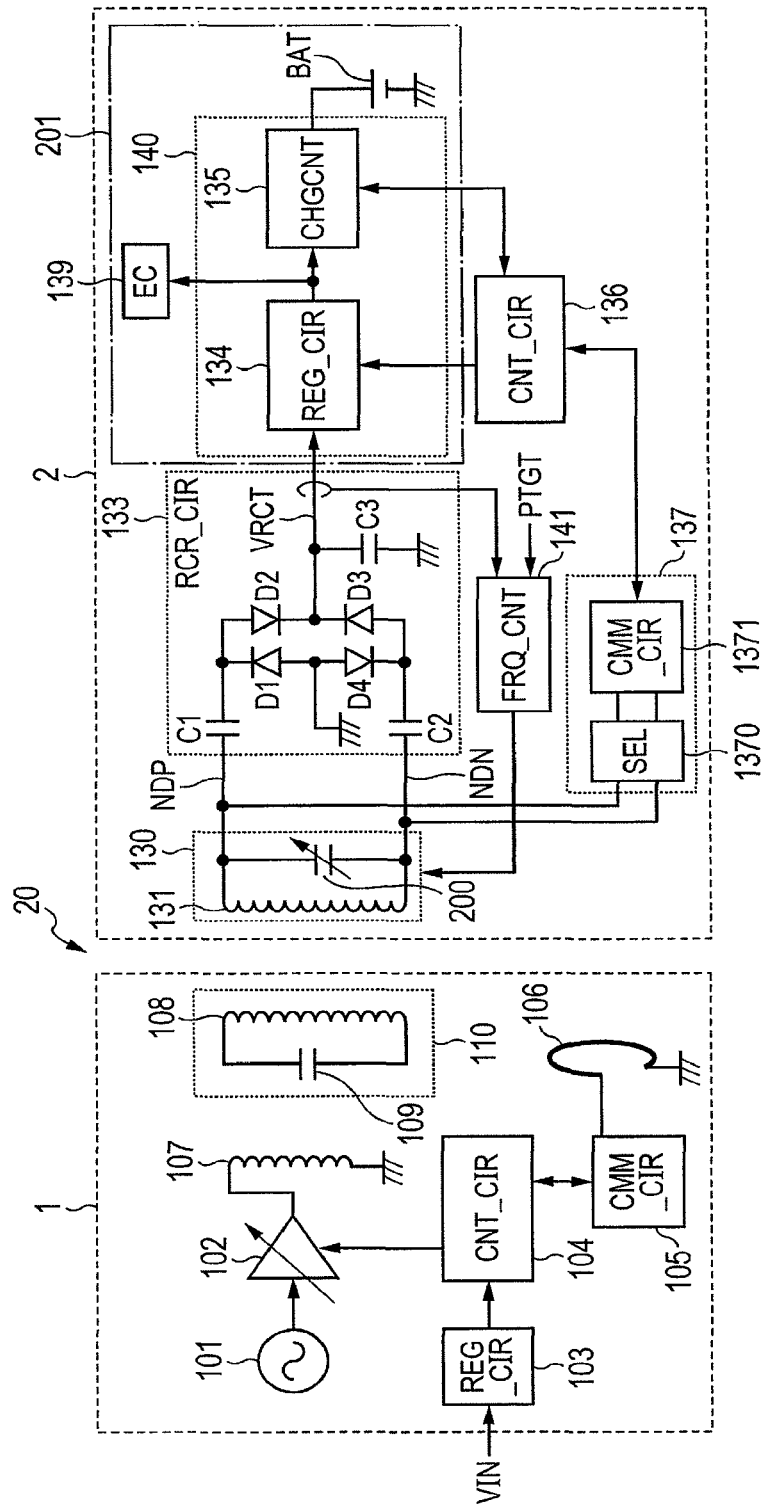
FIG. 2 is a drawing illustrating a non-contact power supply system including the electric power receiving device according to Embodiment 1.

FIG. 2 illustrates a non-contact power supply system including an electric power receiving device according to Embodiment 1. The non-contact power supply system 20 illustrated in the figure includes an electric power transmitting device 1 and an electric power receiving device 2. In the non-contact power supply system 20, the electric power supply from the electric power transmitting device 1 to the electric power receiving device 2 is possible in a non-contact manner (wirelessly). Although not restricted in particular, in the non-contact power supply system 20, non-contact power transmission is realized by the magnetic resonance method utilizing resonant coupling of an electromagnetic field. In the non-contact power transmission, the frequency fTx of an electric power transmission signal outputted as an electric power to be transmitted (electric power transmission frequency) is a frequency in MHz zone, for example.

In the non-contact power supply system 20, transmission and reception of data are mutually enabled between the electric power transmitting device 1 and the electric power receiving device 2, by the short distance radio communication. The short distance radio communication may utilize an NFC (Near Field Communication), for example (called hereinafter "NFC communications"). Although not restricted in particular, the electric power receiving device 2 uses one antenna for both the non-contact power supply of the magnetic resonance type and the NFC communications, and it is possible to switch between the electric power reception and the communications of information.

<A Configuration of the Electric Power Transmitting Device 1>

The electric power transmitting device 1 is configured with, for example, an oscillator 101, a transmitting amplifier 102, a power supply circuit (REG_CIR) 103, a control circuit (CNT_CIR) 104, a communication unit (CMM_CIR) 105, a communication coil antenna 106, an electric power supply coil 107, a resonance coil 108, and a resonance capacitor 109.

The oscillator 101 generates an AC signal of a frequency corresponding to an electric power transmission signal for transmitting the electric power from the electric power transmitting device 1. Although not restricted in particular, the frequency of the AC signal outputted from the oscillator 101 is fixed and equal to the frequency of the electric power transmission signal (electric power transmission frequency) fTx. The transmitting amplifier 102 amplifies the AC signal outputted from the oscillator 101, and generates a driving signal corresponding to the magnitude of the electric power to be transmitted. The transmitting amplifier 102 is a vari-able gain amplifier of which the amplification factor is variable. The transmitting amplifier 102 operates at a voltage generated by the power supply circuit 103 as a power supply, for example, and its amplification factor is varied by adjusting a bias voltage and a bias current which are supplied to the transmitting amplifier 102. The power supply circuit 103 generates plural voltages used as an operation power supply of each functional section of the electric power transmitting device 1, on the basis of an input voltage VIN supplied from a power supply adapter, a universal serial bus (USB), etc. For example, the power supply circuit 103 generates a voltage used as the operation power supply of the transmitting amplifier 102 as described above, and a voltage used as the operation power supply of the control circuit 104.

The driving signal outputted from the transmitting amplifier 102 is supplied to the electric power supply coil 107. The electric power supply coil 107 and the resonance coil 108 are coupled magnetically, and the AC power related to the driving signal supplied to the electric power supply coil 107 is supplied to the resonance coil 108 by electromagnetic induction. The resonance coil 108 and the resonance capacitor 109 configure the resonance circuit 110 on the primary side. The resonance circuit 110 is a parallel resonant circuit where the resonance coil 108 and the resonance capacitor 109 are coupled in parallel, for example. When a magnetic field is generated by resonance by means of the resonance circuit 110, the electric power is transmitted from the electric power transmitting device 1.

The communication unit 105 performs NFC communications via the communication coil antenna 106. For example, the NFC communications realize an exchange of the authentication data for authenticating whether the electric power receiving device 2 is an electric power transmission target of the electric power transmitting device 1, an exchange of the reception notice for notifying whether the electric power receiving device 2 has received the electric power transmitted from the electric power transmitting device 1, and others.

The control circuit 104 includes a program execution device which executes data processing according to a program stored in a memory, etc. The control circuit 104 is a micro controller, for example, and is realized with a semiconductor device which encapsulates a semiconductor chip formed over a semiconductor substrate like one single crystal silicon by the well-known CMOS integrated circuit manufacturing technology, with an insulating resin such as a mold resin. The control circuit 104 performs centralized control of the electric power transmitting device 1. For example, the control circuit 104 controls the execution and halt of the wireless communications via the communication unit 105 and the communication coil antenna 106, and the non-contact power transmission via the resonance coil 108. In addition, the control circuit 104 performs various kinds of data processing in the wireless communications and various kinds of data processing related to the non-contact power transmission. By performing the NFC communications with the electric power receiving device 2 via the communication coil antenna 106, the control circuit 104 performs exchange of the information on the remaining amount of a battery BAT in the electric power receiving device 2 and the various kinds of information for the non-contact power supply, and determines the electric power amount to be transmitted. Then, the control circuit 104 adjusts the amplification factor of the transmitting amplifier 102 according to the electric power amount determined. Accordingly, an electric power corresponding to the electric power amount to be transmitted is sent out from the electric power transmitting device 2.

<A Configuration of the Electric Power Receiving Device 2>

The electric power receiving device 2 is a small portable device, such as a mobile terminal, for example, and performs the transmission and reception of data by use of wireless communications and the electric charging of a battery BAT, etc. by use of non-contact power supply. As described above, the electric power receiving device 2 switches between the NFC communications and the electric power reception, using the resonance coil 131 as the common antenna of the antenna employed for the NFC communications, and the antenna employed for the non-contact power supply of the electromagnetic resonance method.

The electric power receiving device 2 is configured with a resonance coil 131, a resonance capacitor 200, a rectifier circuit (RCR_CIR) 133, an electric power reception IC 140, a control circuit (CNT_CIR) 136, a communication unit 137, an internal electronic circuit (EC) 139, and a battery BAT, for example.

The resonance coil 131 and the resonance capacitor 200 configure a secondary resonance circuit 130, and produce electromotive force (AC signal) by the resonant interaction of the magnetic field generated by the primary resonance circuit 110 of the electric power transmitting device 1. Although the details thereof will be described later, the resonance circuit 130 is a parallel resonant circuit where a coil and a capacitor are coupled in parallel. Hereinafter, one connection node (a positive-side node) where the coil and the capacitor are coupled is expressed by a reference symbol NDP, and the other connection node (a negative-side node) is expressed by a reference symbol NDN.

In the resonance circuit 130, the resonance frequency is changed by adjusting the impedance thereof. For example, the impedance of the resonance circuit 130 is adjusted to shift the resonance frequency of the resonance circuit 130 so as to coincide with an electric power transmission frequency fTx. As the result, it is possible to receive efficiently the magnetic field from the electric power transmitting device 1. Although not restricted in particular, the resonance circuit 130 is configured such that the impedance of the resonance circuit 130 is adjusted by changing the capacitance value of the resonance capacitor 200. The internal configuration of the resonance circuit 130 is described later.

The rectifier circuit 133 rectifies an AC voltage (AC signal) corresponding to the electric power received by the resonance circuit 130 and obtains a DC output voltage. The rectifier circuit 133 is a full wave rectifier circuit, for example. Although not restricted in particular, the rectifier circuit 133 is configured with a diode bridge circuit of Schottky diodes D1-D4, and a smoothing capacitor C3. One input terminal (a connection node of the diode D1 and the diode D2) of the diode bridge circuit is coupled to the node NDP via a capacitor C1, and the other input terminal (a connection node of the diode D3 and the diode D4) is coupled to the node NDN via a capacitor C2. The capacitors C1 and C2 form a matching circuit for adjusting the impedance of the rectifier circuit 133 viewed from the resonance circuit 130. The capacitors C1 and C2 can be deleted depending on the matching state of the impedance.

The smoothing capacitor C3 smoothes the voltage rectified by the diode bridge circuit. The smoothing capacitor C3 is coupled between the output node of the diode bridge circuit and the ground node. Hereinafter, the voltage of the diode bridge circuit at the output node thereof is expresses as a rectified voltage VRCT.

On the basis of the rectified voltage VRCT, the operation of each functional section in the electric power receiving device 2 is enabled. In FIG. 2, the electric power reception IC 140, the internal electronic circuit 139, and the battery BAT are representatively illustrated as a load circuit 201 of the rectifier circuit 133.

The electric power reception IC 140 generates a stable DC voltage based on the rectified voltage VRCT. At the same time, the electric power reception IC 140 supplies the operation power of the internal electronic circuit 139, the charge voltage to the battery BAT, the operation power of the communication unit 137 and the control unit 136, etc. Although not restricted in particular, the electric power reception IC 140 is a semiconductor device which encapsulates a semiconductor chip formed over a semiconductor substrate like one single crystal silicon, by the well-known CMOS integrated circuit manufacturing technology, with an insulating resin such as a mold resin.

Specifically, the electric power reception IC 140 includes a power supply circuit (REG_CIR) 134 and a charging control circuit (CHGCNT) 135. The power supply circuit 134 converts the rectified voltage VRCT into a fixed voltage of a desired magnitude. The power supply circuit 134 is a DC-DC converter, for example, and configures a step-down switching regulator or a series regulator (LDO: Low Drop Out), etc., with an external coil and an external stabilization capacity, etc. The charging control circuit 135 controls electric charging of the battery BAT by the DC voltage generated by the power supply circuit 134. For example, by monitoring the charge current of the battery BAT and the terminal voltage of the battery BAT, the charging control circuit 135 detects the states of the battery BAT (the full charge capacity, the remaining amount, the charging state, etc.), and controls the execution, halt, etc. of the electric charging. Although not restricted in particular, the charging control circuit 135 is a micro controller.

The battery BAT is a secondary battery to which electric charging is possible by the DC voltage generated by the power supply circuit 134. Although not restricted in particular, the battery BAT is a battery of one cell (4.0-4.2V), for example, such as a lithium-ion battery. The internal electronic circuit 139 is an electronic circuit for realizing the characteristic function as the electric power receiving device 2 (for example, if the electric power receiving device 2 is Smartphone, the characteristic function is the function expected as Smartphone).

The communication unit 137 employs the resonance coil 131 as a communications antenna, to perform wireless communications (NFC communications) with the electric power transmitting device 1. Specifically, the communication unit 137 is configured with a switching circuit (SEL) 1370 and a communication control circuit (CMM_CIR) 1371. According to the signal level of the AC signal corresponding to the electric power received by the resonance circuit 130, the switching circuit 1370 controls whether the AC signal concerned is supplied to the communication control circuit 1371 or not. For example, when the signal level of the AC signal corresponding to the electric power received by the resonance circuit 130 exceeds a prescribed threshold, the supply of the AC signal to the communication control circuit 1371 is shut down, and when the signal level of the AC signal does not exceed the prescribed threshold, the AC signal is supplied to the communication control circuit 1371.

The communication control circuit 1371 is a micro controller, for example, and performs the various kinds of control and data processing for realizing the wireless communications via the resonance coil 131 as the communications antenna. Although not restricted in particular, the communication control circuit 1371 is realized with a semiconductor device which encapsulates a semiconductor chip formed over a semiconductor substrate like one single crystal silicon, by the well-known CMOS integrated circuit manufacturing technology, with an insulating resin such as a mold resin.

The control circuit 136 performs centralized control of the electric power receiving device 2. For example, the control circuit 136 controls the execution and halt of the wireless communications via the resonance coil 131, and the various kinds of data processing in the wireless communications (for example, the modulation and demodulation of a received signal). In addition, the control circuit 136 performs the operation control (enabling control) of the power supply circuit 134 and controls the execution and halt of the charge control of the battery BAT by means of the charging control circuit 135. Although not restricted in particular, the control circuit 136 is a micro controller, and is realized with a semiconductor device which encapsulates a semiconductor chip formed over a semiconductor substrate like one single crystal silicon, by the well-known CMOS integrated circuit manufacturing technology, with an insulating resin such as a mold resin.

<Control of the Reception Electric Power Through Adjustment of a Resonance Frequency>

As described above, the electric power transmitting device 1 sends out the electric power to be transmitted corresponding to the electric power amount required by the electric power receiving device 2, on the basis of the information on the remaining amount, etc. of the battery BAT in the electric power receiving device 2. However, due to the difficulty of the transmission control by means of the electric power transmitting device 1, there is a possibility that a larger transmission electric power than the electric power required by the electric power receiving device 2 is outputted. In such a case, in order that the electric power receiving device 2 may not receive a larger electric power than required, the electric power receiving device 2 possesses a function for monitoring the reception electric power in the electric power receiving device 2, and for controlling the resonance frequency of the resonance circuit so as to keep the reception electric power from exceeding an electric power level aimed at (a target electric power level). Specifically, the electric power receiving device 2 is configured further with a resonance frequency adjustment unit (FRQ_CNT) 141.

The resonance frequency adjustment unit 141 monitors the reception electric power received by the resonance circuit 130 and controls the resonance frequency of the resonance circuit 130 so that the reception electric power does not exceed the target electric power level PTGT (so that the reception electric power coincides with the target electric power level PTGT).

More specifically, when the reception electric power does not exceed the target electric power level PTGT, the resonance frequency adjustment unit 141 adjusts the impedance of the resonance circuit 130 so as to match the resonance frequency of the resonance circuit 130 with the electric power transmission frequency fTx, and when the reception electric power exceeds the target electric power level PTGT, the resonance frequency adjustment unit 141 adjusts the impedance of the resonance circuit 130 so as to shift the resonance frequency away from the electric power transmission frequency fTx. The monitoring of the reception electric power by means of the resonance frequency adjustment unit 141 is performed by detecting a rectified voltage VRCT, for example.

Hereinafter, the control of the resonance frequency of the resonance circuit 130 by means of the resonance frequency adjustment unit 141 is explained in detail.

Figure 3:
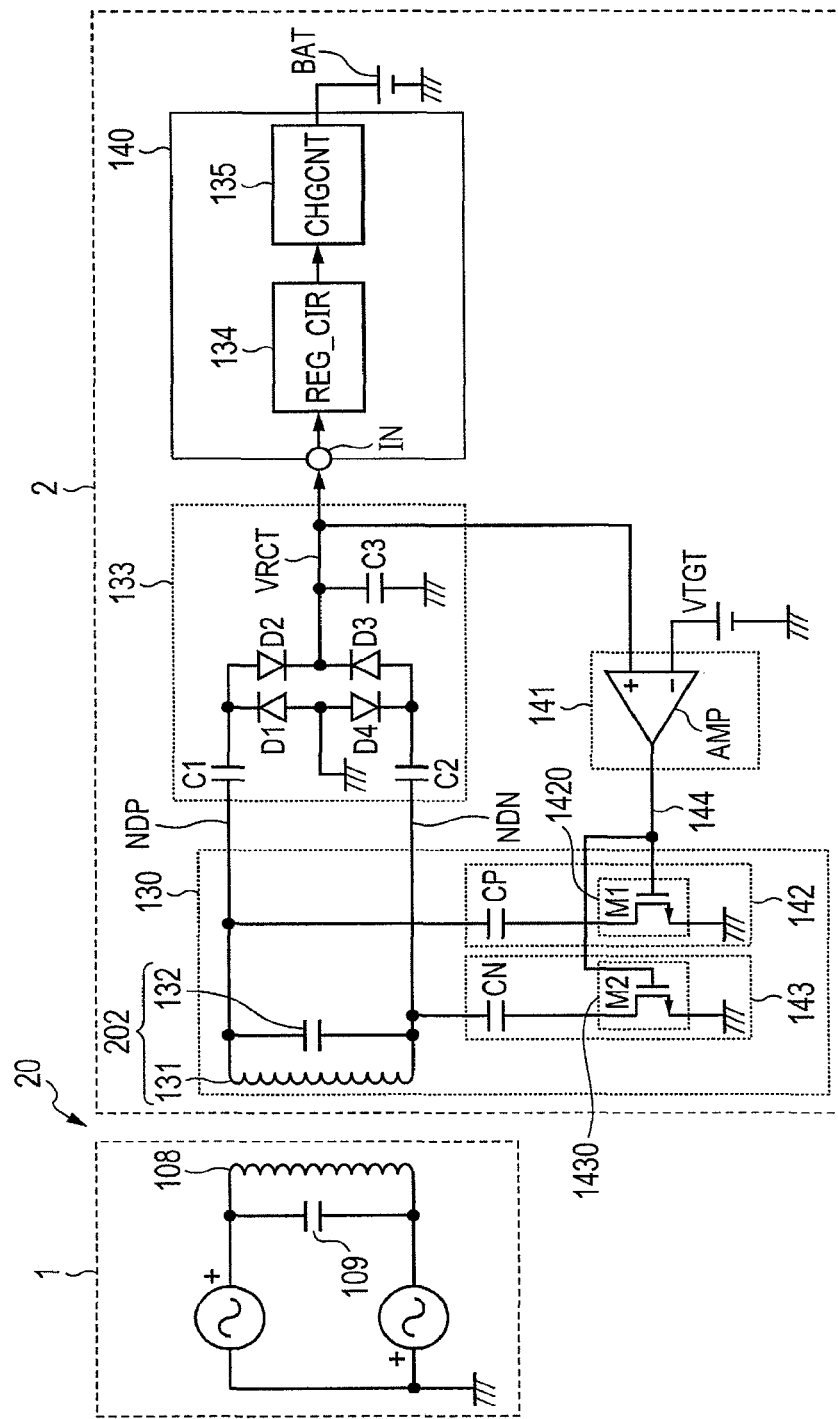
FIG. 3 is a drawing illustrating the internal configuration of a resonance circuit 130 and a resonance frequency adjustment unit 141 in the electric power receiving device according to Embodiment 1.

FIG. 3 illustrates the internal configuration of the resonance circuit 130 and the resonance frequency adjustment unit 141 in the electric power receiving device according to Embodiment 1. In the figure, for convenience of explanation, only functional blocks surrounding the resonance circuit 130 and the resonance frequency adjustment unit 141 are shown, and other functional blocks are not shown. As for the electric power transmitting device 1 in the figure, an electric power transmitting coil 108 and a resonance capacitor 109 are shown, and other functional blocks are shown in a simplified form.

As illustrated in the figure, the resonance frequency adjustment unit 141 is configured with a differential amplifier circuit AMP. The differential amplifier circuit AMP functions as an error amplification circuit which generates a control voltage 144 so as to reduce the difference of the target voltage VTGT determined corresponding to the target electric power level PTGT and the output voltage VRCT of the rectifier circuit 133. The target voltage VTGT is determined corresponding to the voltage required by the electric power reception IC 140 which receives the supply of the rectified voltage VRCT, for example. For example, even if the maximum voltage which is allowed to be applied to the input terminal IN of the electric power reception IC 140 (the withstand voltage of the electric power reception IC 140) is 25V, when the voltage necessary as the input voltage of the power supply circuit 134 of the electric power reception IC 140 is 10V, the target voltage VTGT is set as 10V. Accordingly, the differential amplifier circuit AMP generates the control voltage 144 so as to keep the output voltage VTGT of the rectifier circuit 133 from exceeding 10V (so as to be equal to 10V).

Although not restricted in particular, the target voltage VTGT is generated by a reference voltage generating circuit (not shown) provided in the electric power receiving device 2, and is supplied to the differential amplifier circuit AMP. The reference voltage generating circuit is not restricted in particular, and it may be a regulator circuit provided in the power supply circuit 134 in the electric power reception IC 140, or may be a regulator circuit provided separately from the power supply circuit 134.

The resonance circuit 130 is configured with a parallel resonance unit 202 in which a resonance coil 131 and a resonance capacitor 132 are coupled in parallel, and impedance adjustment circuits 142 and 143 coupled between each of the terminals (nodes NDP, NDN) of the parallel resonance unit 202 and the reference node to which a fixed voltage is supplied. The resonance capacitor 132 and the impedance adjustment circuits 142 and 143 configure the capacitor 200 as the variable capacity.

Although the reference node is a ground node to which the ground voltage is supplied, for example. However, if the node is fixed with respect to DC, the node is not restricted to the ground node.

The impedance adjustment circuit 142 includes a capacitor CP of which one end is coupled to the node NDP and a variable resistance circuit 1420 which is coupled between the other end of the capacitor CP and the ground node. In the variable resistance circuit 1420, a value of the resistance thereof is varied by the control voltage 144 from the differential amplifier circuit AMP. The variable resistance circuit 1420 is configured with a transistor M1, for example. Although not restricted in particular, as the transistor M1, a field effect transistor, an IGBT, etc. having a small on-resistance and a high withstand voltage can be employed. FIG. 3 illustrates the case where the MOS transistor having a high withstand voltage is employed. A source electrode of the transistor M1 is coupled to the ground node, and a drain electrode is coupled to the capacitor CP. The control voltage 144 is supplied to a gate electrode of the transistor M1. The circuit configuration of the variable resistance circuit 1420 is not restricted to the one illustrated in FIG. 3, but another circuit configuration will be applicable, as long as the value of resistance between the capacitor CP and the ground node can be varied according to the control voltage 144.

The impedance adjustment circuit 143 also has the same configuration as the impedance adjustment circuit 142. For example, the impedance adjustment circuit 143 includes a capacitor CN of which one end is coupled to the node NDN and a variable resistance circuit 1430 which is coupled between the other end of the capacitor CN and the ground node. The variable resistance circuit 1430 is configured with a transistor M2, for example, and is driven according to the control voltage 144, as is the case with the transistor M1.

By coupling the impedance adjustment circuits 142 and 143 to the positive side terminal (node NDP) and the negative side terminal (node NDN) of the parallel resonance unit 202, respectively as described above, it is possible to maintain the waveform symmetry of the AC signals (to suppress distortion of the electric power reception waveform) corresponding to the reception electric power generated at the node NDP and the node NDN, respectively.

In the present embodiment, the constants of the resonance coil 131 and the resonance capacitor 132 have been determined so as to match the resonance frequency of the parallel resonance unit 202 (the resonance frequency determined by the resonance coil 131 and the resonance capacitor 132) with the electric power transmission frequency fTx. Here, it is assumed that the parasitic capacitance of the transistors M1 and M2 and others can be ignored. In the present conditions, when the rectified voltage VRCT becomes lower than the target voltage VTGT, the control voltage 144 is controlled to become low by the differential amplifier circuit AMP. Accordingly, the gate-to-source voltage of the transistors M1 and M2 decreases. Therefore, the value of resistance between the drain and the source increases, and the influence of the capacitors CP and CN as the capacity component in the resonance circuit 130 is reduced. That is, the resonance capacitor 132 becomes dominant as the capacity component of the resonance circuit 130, and the resonance frequency of the resonance circuit 130 approaches the resonance frequency determined by the resonance coil 131 and the resonance capacitor 132; that is, the electric power transmission frequency fTx. Finally, when the transistors M1 and M2 become in OFF state, the capacitors CP and CN become in a disconnected state, and the resonance frequency of the resonance circuit 130 substantially coincides with the electric power transmission frequency fTx. Therefore, when the rectified voltage VRCT is lower than the target voltage VTGT, the control by the differential amplifier circuit AMP is performed so as to match the resonance frequency of the resonance circuit 130 with the electric power transmission frequency fTx.

On the other hand, when the rectified voltage VRCT becomes higher than the target voltage VTGT, the control voltage 144 is controlled to become high by the differential amplifier circuit AMP. Accordingly, the gate-to-source voltage of the transistors M1 and M2 increases. Therefore, the value of resistance between the drain and the source decreases, and the influence of the capacitors CP and CN as the capacity component in the resonance circuit 130 is increased. That is, the resonance frequency of the resonance circuit 130 is determined by the resonance coil 131, the resonance capacitor 132, and the capacitors CP and CN. Accordingly, the resonance frequency of the resonance circuit 130 deviates from the electric power transmission frequency fTx. Therefore, when the rectified voltage VRCT is higher than the target voltage VTGT, the control by the differential amplifier circuit AMP is performed so as to shift the resonance frequency of the resonance circuit 130 away from the electric power transmission frequency fTx.

In this way, by controlling the resonance frequency of the resonance circuit 130 linearly, the reception electric power of the electric power receiving device 2 is restricted so as to keep the rectified voltage VRCT from exceeding the target voltage VTGT.

As described above, according to the electric power receiving device according to Embodiment 1, the reception electric power received by the resonance circuit 130 is monitored, and the resonance frequency is controlled so as to keep the reception electric power from exceeding the target electric power level PTGT. Therefore, even when an electric power larger than the electric power required by the receiving side is transmitted from the transmitting side, the electric power receiving device 2 operates not to receive the electric power greater than the target electric power level. Accordingly, the electric power receiving device 2 does not receive the excessive electric power more than required; therefore, it is possible to suppress the heat generation in the electric power receiving device 2. For example, even when an over-voltage protection diode is coupled to the output node of the rectifier circuit 133 as in the related art, the generation of heat based on the surplus electric power consumed in the over-voltage protection diode can be suppressed. Therefore, it is possible to suppress the heating value of the entire electric power receiving device, compared with the past.

By applying the present electric power receiving device to a non-contact power supply system, it becomes possible to realize a reliable non-contact power supply system, suppressing that the transmission control in the electric power transmitting device becomes complicated. For example, the present electric power receiving device operates not to receive an electric power greater than the target electric power level, even when an electric power larger than the electric power required is transmitted. Therefore, even if the reliability of the transmission control on the transmitting side is somewhat low, there is little possibility that the electric power receiving device may be destroyed due to heat generation more than required. Therefore, it is possible to enhance the entire reliability of the non-contact power supply system, attaining the simplification of the internal electronic circuit for the electric power transmission control and the program for controlling it in the electric power transmitting device.

Furthermore, as described above, the reception electric power is monitored by monitoring the output voltage VRCT of the rectifier circuit 133, and the impedance of the resonance circuit 130 is adjusted so as to keep the output voltage VRCT from exceeding the target voltage VTGT. By this method, it is possible to control the resonance frequency, with ease and a high degree of accuracy. Since the control is performed so as to keep the output voltage VRCT from exceeding the target voltage VTGT, it is possible to reduce the difference between the input voltage (the rectified voltage VRCT) and the output voltage in the power supply circuit 134, more than those in the past. That is, it is possible to reduce the input-output potential difference of the DC-DC converter configured by the power supply circuit 134. For example, in the past, when a DC-DC converter has generated an output voltage of 5V, an input voltage (a rectified voltage VRCT) of the DC-DC converter may have risen up to the upper limit voltage (for example, 20V) determined by an over-voltage protection diode. As compared with this, according to the present electric power receiving device, the input voltage of the DC-DC converter is controlled not to exceed the target voltage VTGT (for example, 10V). Therefore, it is possible to reduce the input-output potential difference of the DC-DC converter (the power supply circuit 134) more than those in the past. Accordingly, it becomes possible to improve the voltage conversion efficiency by means of the DC-DC converter, and to suppress the heat generation in the DC-DC converter (the power supply circuit 134).

Embodiment 2

Figure 4:
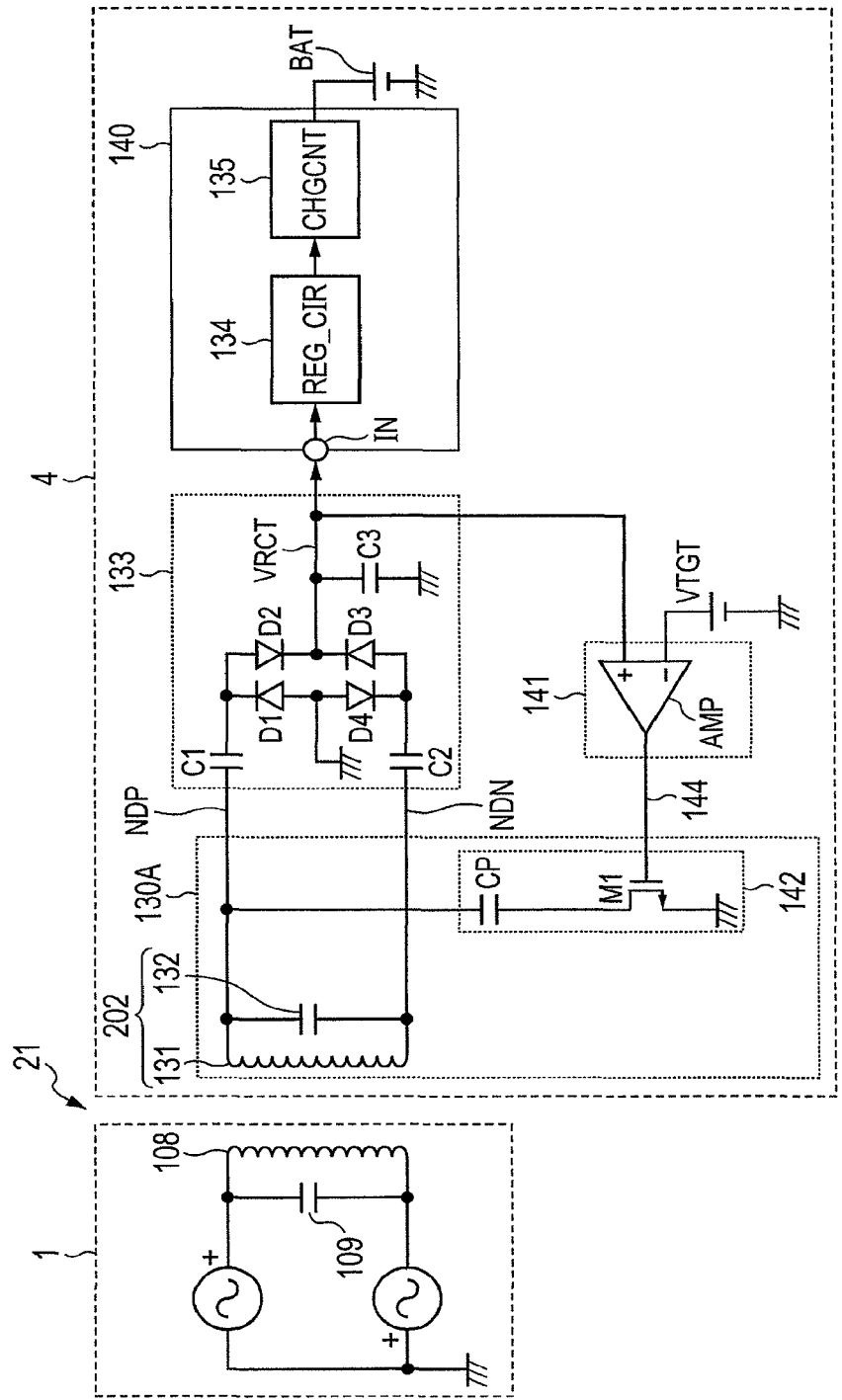
FIG. 4 is a drawing illustrating a non-contact power supply system including an electric power receiving device according to Embodiment 2.

FIG. 4 illustrates a non-contact power supply system including an electric power receiving device according to Embodiment 2.

An electric power receiving device 4 in a non-contact power supply system 21 according to Embodiment 2 is different from the electric power receiving device according to Embodiment 1 in the point that an impedance adjustment circuit is coupled only to one terminal of the parallel resonance unit in the resonance circuit on the receiving side. The configuration of other parts of the electric power receiving device 4 is the same as that of the electric power receiving device 2 according to Embodiment 1, therefore, the same symbol is attached to the same component as the electric power receiving device 2, and the detailed explanation thereof is omitted.

As illustrated in FIG. 4, the resonance circuit 130A in the electric power receiving device 4 has a configuration in which the impedance adjustment circuit 142 is coupled to one terminal (the node NDP) of the parallel resonance unit 202, and no impedance adjustment circuit is coupled to the other terminal (the node NDN).

According to this configuration, as is the case with the electric power receiving device 2 according to Embodiment 1, it is possible not to receive an excessive electric power more than the electric power required by the electric power receiving device 4, and to suppress the heat generation of the electric power receiving device 4. According to the electric power receiving device 4, the symmetry of AC signals corresponding to the reception electric power generated at the node NDP and the node NDN may collapse. However, when the degree of the collapse of the symmetry is allowable, it is possible to reduce the number of components which are otherwise to be added. Therefore, it is possible to suppress the increase in cost of the electric power receiving device accompanied by enabling the adjustment of the resonance frequency.

It is sufficient that the impedance adjustment circuit for adjusting the resonance frequency is coupled to either of the positive side terminal or the negative side terminal of the parallel resonance unit 202, and it is not restricted to the configuration in which the impedance adjustment circuit is coupled to the positive side terminal (the node NDP) of the parallel resonance unit 202 as illustrated in FIG. 4. For example, another configuration is also preferable in which the impedance adjustment circuit 142 (143) is coupled to the negative side terminal (the node NDN) of the parallel resonance unit 202.

Embodiment 3

Figure 5:
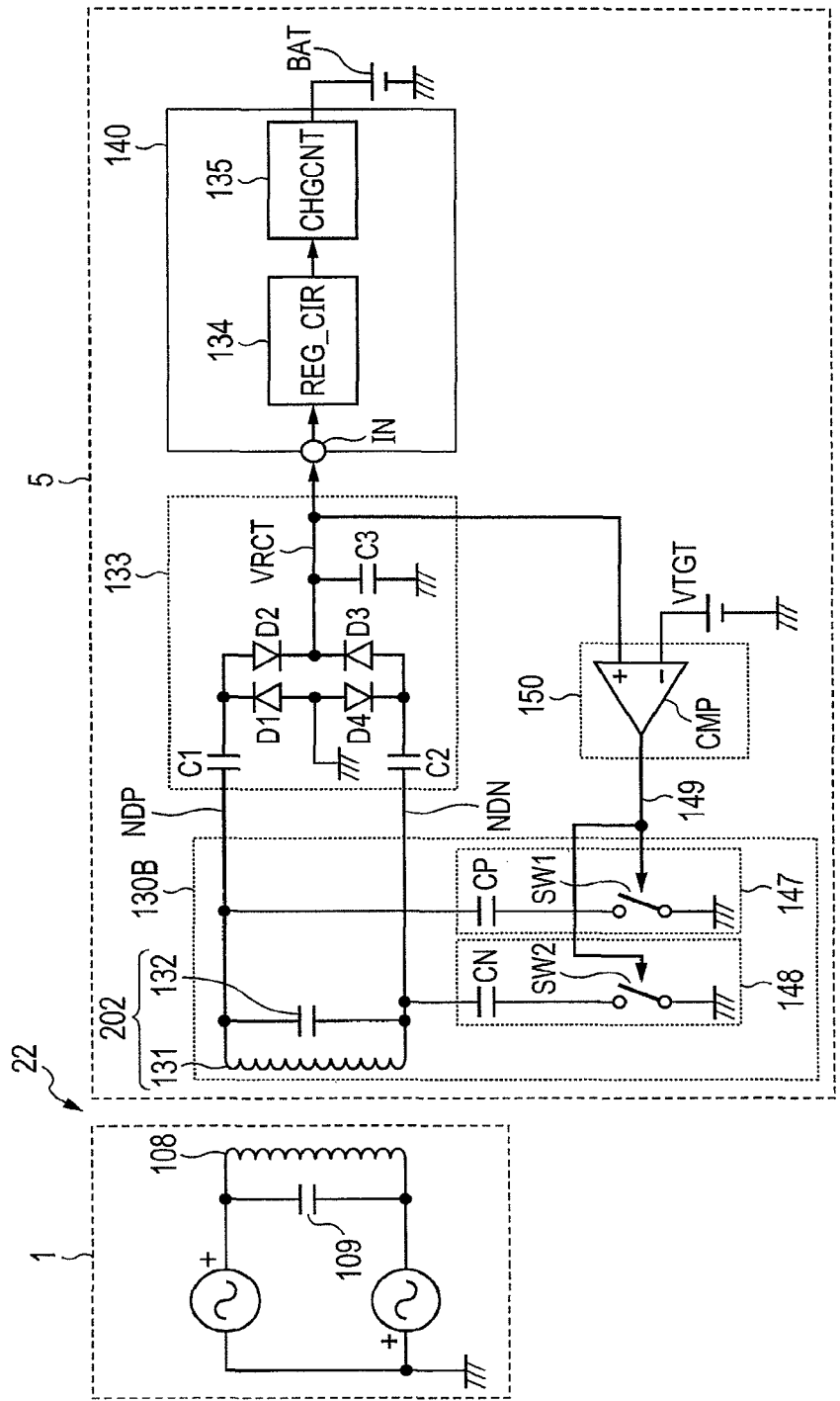
FIG. 5 is a drawing illustrating a non-contact power supply system including an electric power receiving device according to Embodiment 3.

FIG. 5 illustrates a non-contact power supply system including an electric power receiving device according to Embodiment 3.

The electric power receiving device 2 according to Embodiment 1 performs the linear control over the impedance adjustment circuit for adjusting the resonance frequency of the resonance circuit, by means of the differential amplifier circuit; however, an electric power receiving device 5 according to Embodiment 3 performs the switching control over the impedance adjustment circuit, by means of a comparator circuit.

As illustrated in FIG. 5, the electric power receiving device 5 in the non-contact power supply system 22 is provided with a resonance frequency adjustment unit 150 configured with a comparator circuit CMP, in lieu of the resonance frequency adjustment unit 140 according to Embodiment 1. The resonance circuit 130B of the electric power receiving device 5 is provided with impedance adjustment circuits 147 and 148, in lieu of the impedance adjustment circuits 142 and 143 according to Embodiment 1. The configuration of other parts of the electric power receiving device 5 is the same as that of the electric power receiving device 2 according to Embodiment 1, therefore, the same symbol is attached to the same component as the electric power receiving device 2, and the detailed explanation thereof is omitted.

The comparator circuit CMP compares the rectified voltage VRCT with the target voltage VTGT and outputs the comparison result. For example, the comparator circuit CMP outputs a comparison result signal 149 of a high level (High), when the output voltage VRCT is greater than the target voltage VTGT, and outputs a comparison result signal 149 of a low level (Low), when the output voltage VRCT is smaller than the target voltage VTGT.

The impedance adjustment circuit 147 includes a capacitor CP of which one end is coupled to the node NDP and a switching element SW1 provided between the other end of the capacitor CP and the ground node. The switching element SW1 is on-off controlled, on the basis of the comparison result signal 149 from the comparator circuit CMP.

The impedance adjustment circuit 148 also has the same configuration as the impedance adjustment circuit 147. For example, the impedance adjustment circuit 148 includes a capacitor CN of which one end is coupled to the node NDN and a switching element SW2 coupled between the other end of the capacitor CN and the ground node. The switching element SW2 is the same as the switching element SW1.

In addition to a field effect transistor, an IGBT, etc. having a small on-resistance and a high withstand voltage, mechanical switches, such as a relay switch, can be employed as the switching elements SW1 and SW2. When a mechanical switch is employed as the switching elements SW1 and SW2, parasitic capacitance of the switching elements SW1 and SW2 can be reduced. Therefore, it is possible to further alleviate the influence on the resonance circuit according to the fact that the capacitors CP and CN are coupled to the nodes NDP and NDN, when the switching elements SW1 and SW2 are set to OFF. Accordingly, it is possible to further reduce the setting error of the resonance frequency of the resonance circuit 130 determined by the resonance coil 131 and the resonance capacitor 132, at the time when the switching elements SW1 and SW2 are set to OFF.

In the present embodiment, as is the case with Embodiment 1, the constants of the resonance coil 131 and the resonance capacitor 132 are determined so as to match the resonance frequency of the parallel resonance unit 202 with the electric power transmission frequency fTx. In this state, when the rectified voltage VRCT becomes lower than the target voltage VTGT, the comparison result signal 149 is set to, for example, a low level by the comparator circuit CMP; accordingly, the switching elements SW1 and SW2 are set to OFF. Accordingly, the capacitors CP and CN are brought to a disconnected state, and the resonance capacitor 132 becomes dominant as the capacity component in the resonance circuit 130B. As a result, the resonance frequency of the resonance circuit 130B approaches the resonance frequency determined by the resonance coil 131 and the resonance capacitor 132 (nearly equal to the electric power transmission frequency fTx). That is, when the rectified voltage VRCT is lower than the target voltage VTGT, the control is performed so as to match the resonance frequency of the resonance circuit 130B with the electric power transmission frequency fTx.

When the rectified voltage VRCT becomes higher than the target voltage VTGT, on the other hand, the comparison result signal 149 is set to a high level by the comparator circuit CMP, and the switching elements SW1 and SW2 are set to ON. Accordingly, the resonance frequency of the resonance circuit 130B is determined by the resonance coil 131, the resonance capacitor 132, and the capacitors CP and CN, and deviates from the electric power transmission frequency fTx. That is, when the rectified voltage VRCT is higher than target voltage VTGT, the control is performed so as to shift the resonance frequency of the resonance circuit 130B away from the electric power transmission frequency fTx.

Figure 6:
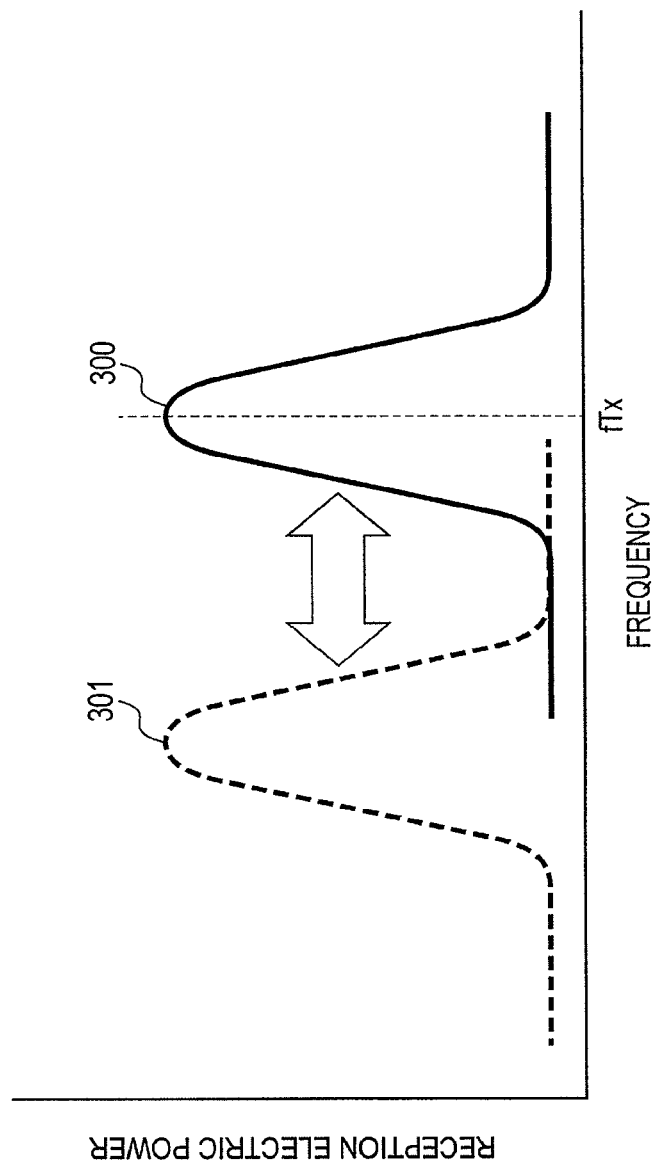
FIG. 6 is a drawing illustrating characteristics of reception electric power when a resonance frequency is changed in the electric power receiving device 5 according to Embodiment 3.

FIG. 6 illustrates characteristics of the reception electric power when the resonance frequency is changed in the electric power receiving device 5 according to Embodiment 3.

In the figure, the vertical axis expresses reception electric power and the horizontal axis expresses frequency. A reference symbol 300 illustrates the characteristics of the reception electric power when the rectified voltage VRCT is smaller than the target voltage VTGT (when the switching elements SW1 and SW2 are set to OFF). A reference symbol 301 illustrates the characteristics of the reception electric power when the rectified voltage VRCT is greater than the target voltage VTGT (when the switching elements SW1 and SW2 are set to ON). The frequency at the peak value of the characteristics 300 and 301 is a resonance frequency of the resonance circuit 130B in each of the characteristics.

As understood from the characteristics 300, when the rectified voltage VRCT is smaller than the target voltage VTGT, the switching elements SW1 and SW2 are set to OFF, and the resonance frequency of the resonance circuit 130B substantially coincides with the electric power transmission frequency fTx. Accordingly, the reception electric power by means of the resonance circuit 130B (the reception electric power at the frequency fTx) becomes maximum. On the other hand, as understood from the characteristics 301, when the rectified voltage VRCT is greater than the target voltage VTGT, the switching elements SW1 and SW2 are set to ON, and the resonance frequency of the characteristics 301 deviates from the electric power transmission frequency fTx greatly. Accordingly, the reception electric power via the resonance circuit 130B (the reception electric power at the frequency fTx) falls greatly.

In this way, by on-off controlling the switching elements SW1 and SW2 (by performing the switching control), depending on whether the rectified voltage VRCT exceeds the target voltage VTGT, the resonance frequency undergoes a binary switching control, and the electric power receiving device 6 shifts between the reception enabled state (the characteristics 300) and the reception disenabled state (the characteristics 301). Accordingly, when taking a time average, the reception electric power will settle in the desired electric power (the mean electric power of the characteristics 300 and the characteristics 301). Therefore, it is possible to restrict the reception electric power of the electric power receiving device, and to suppress the heat generation of the electric power receiving device.

FIG. 5 illustrates the configuration in which the impedance adjustment circuits 147 and 148 are coupled to the terminals of both sides (the nodes NDP, NDN) of the parallel resonance unit 202, respectively. However, it is also preferable to employ the configuration in which an impedance adjustment circuit is coupled to either of the nodes NDP and NDN, such as the electric power receiving device 4 according to Embodiment 2. According to this configuration, the symmetry of AC signals corresponding to the reception electric power generated at the node NDP and the node NDN may collapse. However, when the degree of the collapse of the symmetry is allowable, it is possible to reduce the number of components which are otherwise to be added. Therefore, it is possible to suppress the increase in cost of the electric power receiving device accompanied by enabling the adjustment of the resonance frequency.

Embodiment 4

Figure 7:
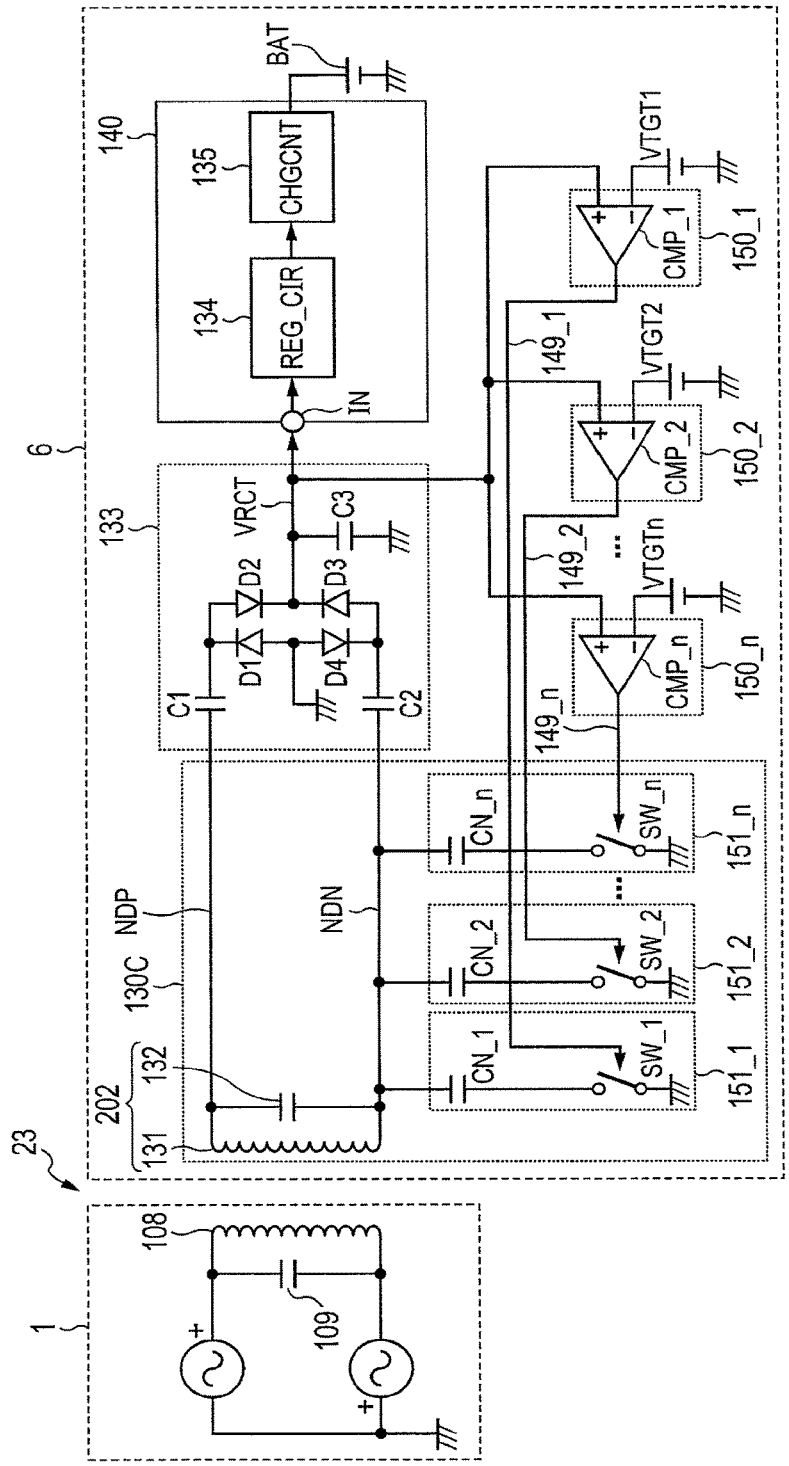
FIG. 7 is a drawing illustrating a non-contact power supply system including an electric power receiving device according to Embodiment 4.

FIG. 7 illustrates a non-contact power supply system including an electric power receiving device according to Embodiment 4.

An electric power receiving device 6 in a non-contact power supply system 23 according to Embodiment 4 is different from the electric power receiving device 5 according to Embodiment 3 in the point that plural comparator circuits perform the switching control of plural impedance adjustment circuits.

As illustrated in FIG. 7, the electric power receiving device 6 includes plural comparator circuits 150_1-150_$n$ ($n$ is an integer greater than one). The comparator circuits 150_1-150_$n$ are supplied with respectively different threshold voltages VTGT1–VTGTn. For example, when the target voltage of the rectified voltage VRCT is 10V, the threshold voltages VTGT1–VTGTn are set up as a gradually increasing voltage to the target voltage, such that the threshold voltage VTGT1 is 10V, the threshold voltage VTGT2 is 11V, the VTGT3 is 12V, and so on.

A resonance circuit 130C includes n impedance adjustment circuits 151_1-151_$n$, provided respectively corresponding to the comparator circuits 150_1-150_$n$. For example, the impedance adjustment circuit 151_1 includes a capacitor CN_1 and a switching element SW_1. One end of the capacitor CN_1 is coupled to one terminal of the parallel resonance unit 202 (the node NDP or the node NDN), and the switching element SW_1 is coupled between the other end of the capacitor CN_1 and the reference node (ground node). The impedance adjustment circuits 151_2-151_$n$ have the same configuration as the impedance adjustment circuit 151_1, and include capacitors CN_2-CN_n and switching elements SW_2-SW_n, respectively. FIG. 7 illustrates the case where one end of each of the capacitors CN_1-CN_n is coupled to the node NDN; however, the one end may be coupled to the node NDP. As the switching elements SW_1-SW_n, a high withstand voltage transistor, a mechanical switch, etc. may be employed, as is the case with the switching element SW.

The impedance adjustment circuits 151_1-151_n are controlled by the corresponding comparison result signals 149_1-149_n of the comparator circuits 150_1-150_n. For example, in the impedance adjustment circuit 151_1, the switching element SW_1 is on-off controlled by the comparison result signal 149_1 of the comparator circuit 150_1, and in the impedance adjustment circuit 151_n, the switching element SW_n is on-off controlled by the comparison result signal 149_n of the comparator circuit 150_n.

Here, the constants of the resonance coil 131 and the resonance capacitor 132 are determined so as to match the resonance frequency of the parallel resonance unit 202 with the electric power transmission frequency fTx when all the switching elements SW_1-SW_n of the impedance adjustment circuits 151_1-151_n are set to OFF.

The following explains concretely the control of the reception electric power by means of the electric power receiving device 6, for the case of n=3 as the number of the comparator circuits and the impedance adjustment circuits. It is assumed that VTGT1=10V, VTGT2=12V, and VTGT3=14V.

Figure 8:
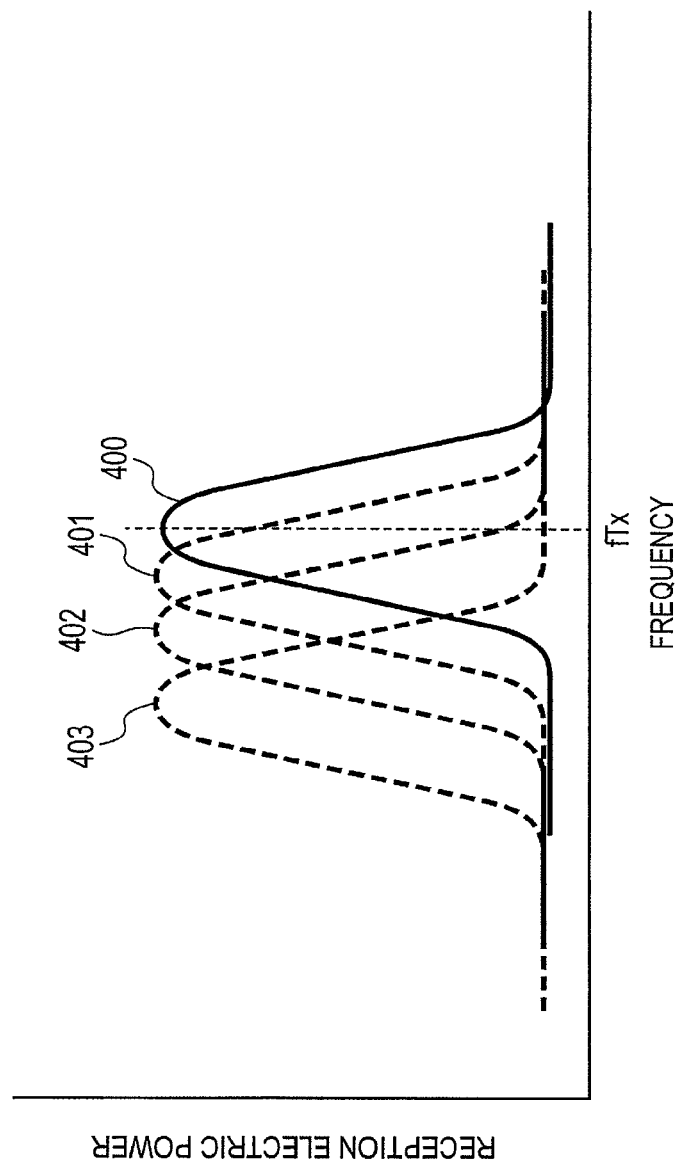
FIG. 8 is a drawing illustrating characteristics of reception electric power when a resonance frequency is changed in the electric power receiving device 6 according to Embodiment 4.

FIG. 8 illustrates characteristics of the reception electric power when the resonance frequency is changed in the electric power receiving device 6 according to Embodiment 4.

In the figure, the vertical axis expresses reception electric power and the horizontal axis expresses frequency. The reference symbol 400 illustrates the characteristics of the reception electric power when the rectified voltage VRCT is smaller than the threshold voltage VTGT1 (10V). The reference symbol 401 illustrates the characteristics of the reception electric power when the rectified voltage VRCT is greater than the threshold voltage VTGT1 (10V) and smaller than the threshold voltage VTGT2 (12V). The reference symbol 402 illustrates the characteristics of the reception electric power when the rectified voltage VRCT is greater than the threshold voltage VTGT2 (12V) and smaller than the threshold voltage VTGT3 (14V). The reference symbol 403 illustrates the characteristics of the reception electric power when the rectified voltage VRCT is greater than the threshold voltage VTGT3 (14V).

As understood from the characteristics 400, when the rectified voltage VRCT is smaller than the threshold voltage VTGT1 (10V), all the switching elements SW_1-SW_3 are set to OFF, and the resonance frequency of the resonance circuit 130C substantially coincides with the electric power transmission frequency fTx. Accordingly, the reception electric power by means of the resonance circuit 130C becomes the maximum.

As understood from the characteristics 401, when the rectified voltage VRCT is greater than the threshold voltage VTGT1 (10V) and smaller than the threshold voltage VTGT2 (12V), only the switching element SW_1 is set to ON, and the resonance frequency of the characteristics 401 departs from the electric power transmission frequency fTx. Accordingly, the reception electric power (the reception electric power at the frequency fTx) by means of the resonance circuit 130C decreases rather than the case of the characteristics 400.

As understood from the characteristics 402, when the rectified voltage VRCT is greater than the threshold voltage VTGT2 (12V) and smaller than the threshold voltage VTGT3 (14V), the switching elements SW_1 and SW_2 are set to ON, and the resonance frequency departs further from the electric power transmission frequency fTx. Accordingly, the reception electric power by means of the resonance circuit 130C decreases further than the case of the characteristics 401.

Furthermore, as understood from the characteristics 403, when the rectified voltage VRCT is greater than the threshold voltage VTGT3 (12V), all the switching elements SW_1-SW_3 are set to ON, and the resonance frequency departs further from the electric power transmission frequency fTx. Accordingly, the reception electric power by means of the resonance circuit 130C decreases further than the case of the characteristics 402.

In this way, by switching the impedance of the resonance circuit 130C stepwise corresponding to the voltage level of the rectified voltage VRCT, it is possible to change the resonance frequency stepwise. Therefore, it is possible to perform the control of the reception state in a similar manner as the analog control (linear control). Accordingly, the electric power receiving device is stabilized with the electric power reception characteristics corresponding to the necessary electric power amount. Therefore, when there is no change in the transmission electric power and the power consumption of the electric power receiving device, no shift of the reception state will take place; accordingly, generation of the switching noise in the control system is suppressed. Therefore, it is possible to reduce the EMI noise, compared with the control in which the state transition occurs between two states of the reception enabled state and the reception disenabled state.

Embodiment 5

Figure 9:
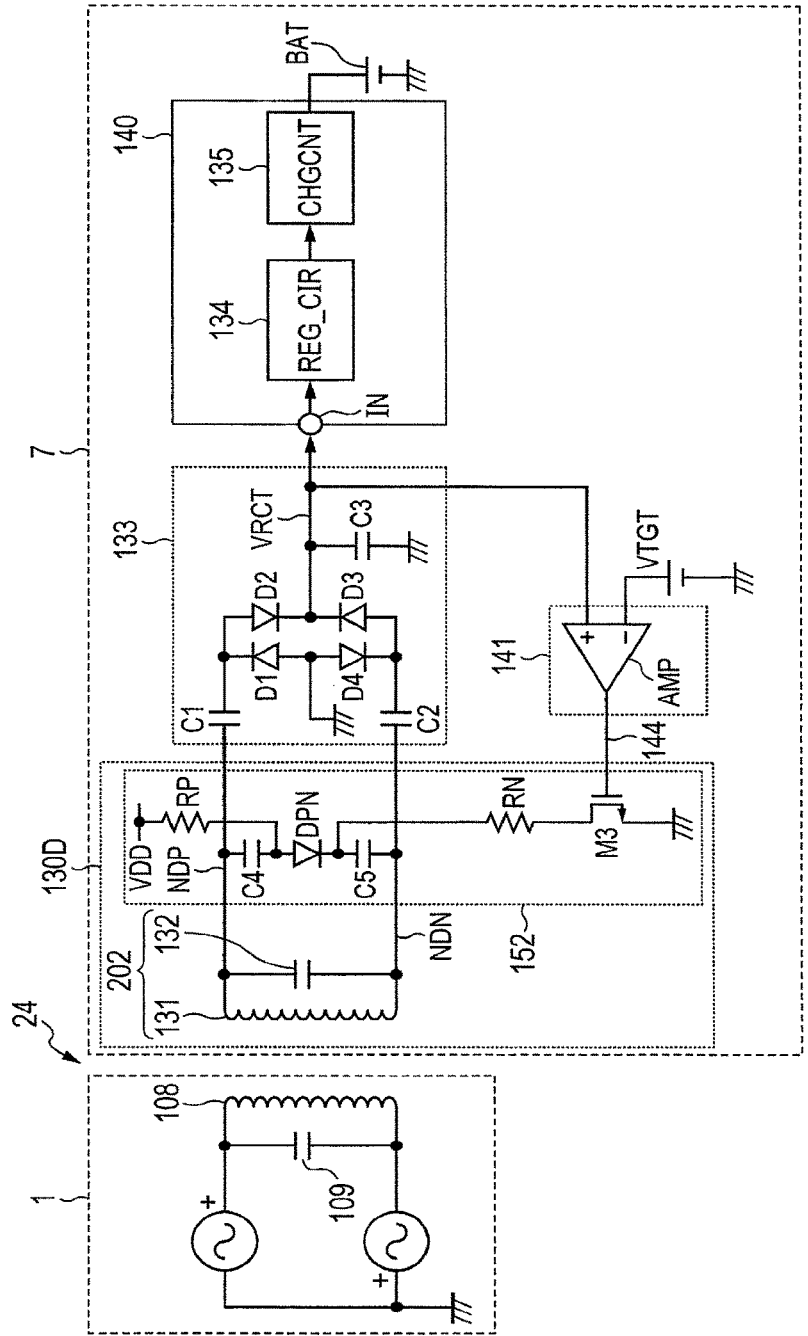
FIG. 9 is a drawing illustrating a non-contact power supply system including an electric power receiving device according to Embodiment 5.

FIG. 9 illustrates a non-contact power supply system including an electric power receiving device according to Embodiment 5.

An electric power receiving device 7 in a non-contact power supply system 24 according to Embodiment 5 is different from the electric power receiving device according to the other embodiments in the point that a PIN diode is used as the impedance adjustment circuit for adjusting the resonance frequency of the resonance circuit.

As illustrated in the figure, the electric power receiving device 7 includes an impedance adjustment circuit 152. The impedance adjustment circuit 152 is configured with capacitors C4 and C5, a PIN diode DPN, resistors RP and RN, and a transistor M3, for example. The capacitor C4, the PIN diode DPN, and the capacitor C5 are coupled in series between the node NDP and the node NDN. The anode of the PIN diode DPN is coupled to the node NDP via the capacitor C4, and the cathode is coupled to the node NDN via the capacitor C5. The anode of the PIN diode DPN is coupled to a node VDD to which a bias voltage is supplied via the resistor RP (for example, a power node to which the power supply voltage is supplied). The cathode of the PIN diode DPN is coupled to the ground node via the resistor RN and the transistor M3. A gate electrode of the transistor M3 is driven by a control voltage 144 of the differential amplifier circuit AMP. As the transistor M3, a field effect transistor, an IGBT, etc. having a small on-resistance and a high withstand voltage can be employed. The configuration of other parts of the electric power receiving device 7 is the same as that of the electric power receiving device 2 according to Embodiment 1.

According to the above-described configuration, the transistor M3 is controlled by the differential amplifier circuit AMP; accordingly, the bias voltage applied to the PIN diode DPN is adjusted and the capacitance value of the rectifier circuit 133 changes. Accordingly, the resonance frequency is adjusted so as to keep the rectified voltage VRCT from exceeding the target voltage VTGT. Therefore, it is possible to restrict the reception electric power of the electric power receiving device 7, and to suppress the heat generation of the electric power receiving device 7. It is possible to change easily the capacitance value of the resonance circuit by employing the PIN diode DPN.

Embodiment 6

Figure 10:
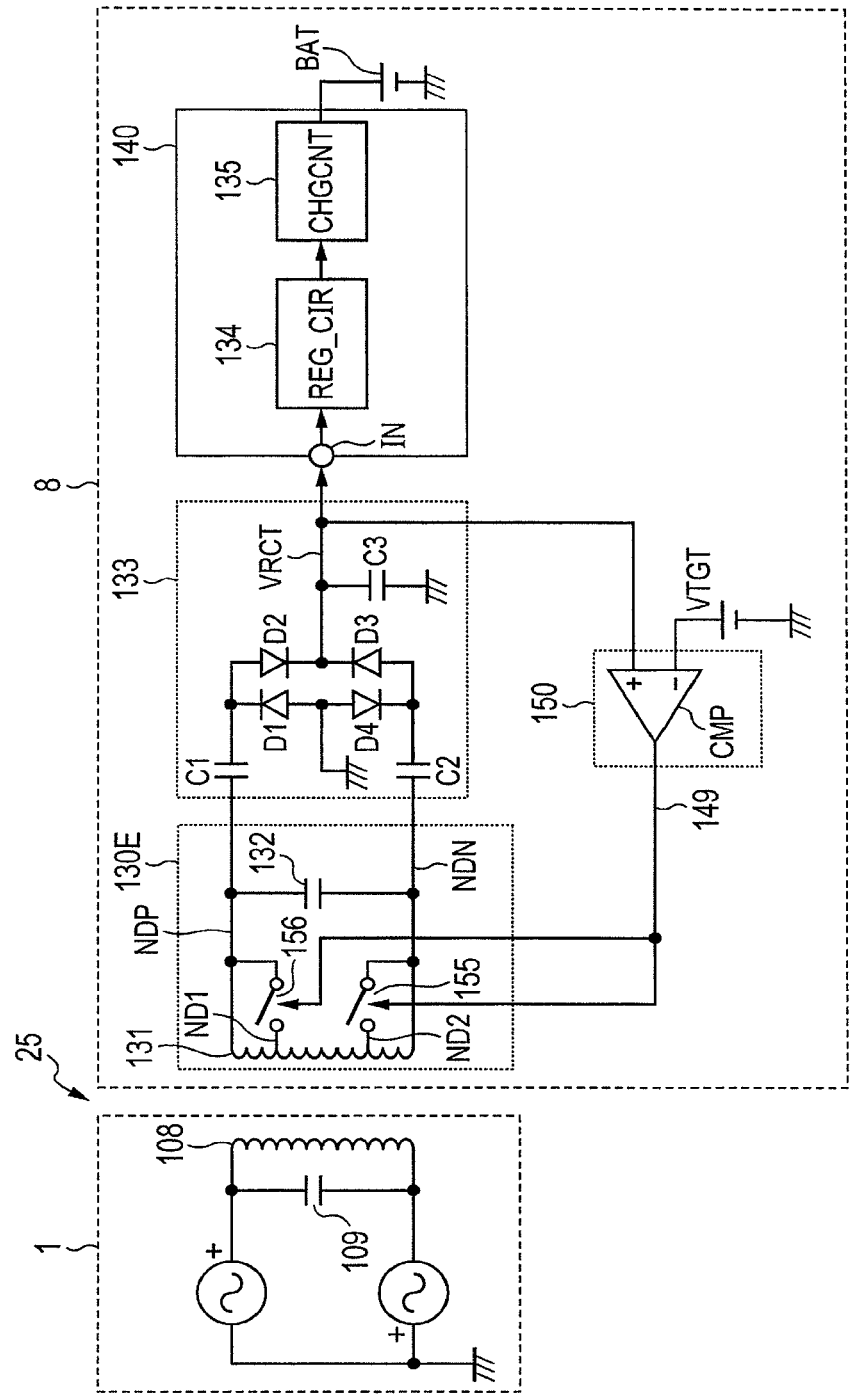
FIG. 10 is a drawing illustrating a non-contact power supply system including an electric power receiving device according to Embodiment 6.

FIG. 10 illustrates a non-contact power supply system including an electric power receiving device according to Embodiment 6.

An electric power receiving device 8 in a non-contact power supply system 25 according to Embodiment 6 is different from the electric power receiving device according to the other embodiments in the point that the inductance of the resonance coil 131 is changed in order to adjust the resonance frequency of the resonance circuit.

The electric power receiving device 8 illustrated in the figure is provided with switching elements 155 and 156 for adjusting the inductance of the resonance coil 131 in the resonance circuit 130E. The switching element 156 is coupled between an intermediate node ND1 of the resonance coil 131 and the node NDP, and the switching element 155 is coupled between an intermediate node ND2 of the resonance coil 131 and the node NDN. The switching elements 155 and 156 are on-off controlled by the comparison result signal 149 of the comparator circuit CMP. The configuration of other parts in the electric power receiving device 8 is the same as that of the electric power receiving device 5 according to Embodiment 3.

The constants of the resonance coil 131 and the resonance capacitor 132 have been determined so as to match the resonance frequency determined by the resonance coil 131 and the resonance capacitor 132 with the electric power transmission frequency fTx when the switching elements 155 and 156 are set to OFF.

For example, when the rectified voltage VRCT is smaller than the target voltage VTGT, the switching elements 155 and 156 are set to OFF, and the inductance of the resonance coil 131 becomes the maximum; accordingly, the resonance frequency of the resonance circuit 130E substantially coincides with the electric power transmission frequency fTx. Accordingly, the reception electric power by means of the resonance circuit 130E becomes the maximum. When the rectified voltage VRCT is greater than the target voltage VTGT on the other hand, the switching elements 155 and 156 are set to ON, and the inductance of the resonance coil 131 decreases; accordingly, the resonance frequency of the resonance circuit 130E deviates from the electric power transmission frequency fTx. Accordingly, the reception electric power of the resonance circuit 130D decreases greatly.

As described above, the inductance of the resonance circuit 130E is adjusted, and the resonance frequency is adjusted so as to keep the rectified voltage VRCT from exceeding the target voltage VTGT. Therefore, it is possible to restrict the reception electric power of the electric power receiving device 8, and to suppress the heat generation of the electric power receiving device 8.

Embodiment 7

Figure 11:
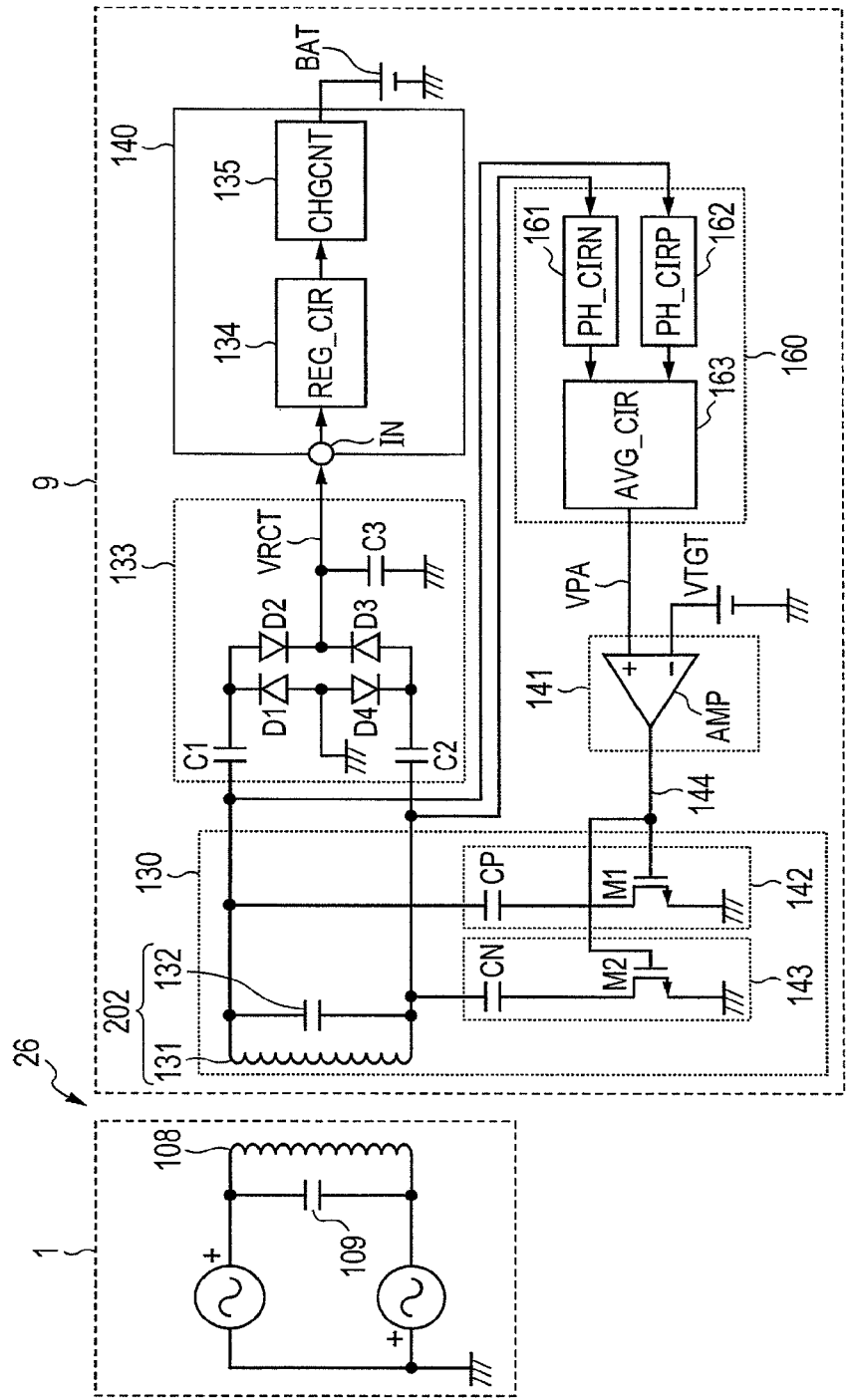
FIG. 11 is a drawing illustrating a non-contact power supply system including an electric power receiving device according to Embodiment 7.

FIG. 11 illustrates a non-contact power supply system including an electric power receiving device according to Embodiment 7.

An electric power receiving device 9 in a non-contact power supply system 26 according to Embodiment 7 is different from the electric power receiving device according to the other embodiments in the point that the reception electric power is monitored by monitoring the input voltage of the rectifier circuit 133.

The electric power receiving device 9 illustrated in the figure further includes an input voltage detection unit 160 for detecting the input voltage supplied to the rectifier circuit 133 via the resonance circuit 130. The input voltage detection unit 160 includes for example, a peak hold circuit (PH_CIRP) 162 which detects the peak value of the positive side input voltage of the rectifier circuit 133 (voltage at the node NDP), and a peak hold circuit (PH_CIRN) which detects the peak value of the negative side input voltage of the rectifier circuit 133 (voltage at the node NDN). The input voltage detection unit 160 further includes an averaging circuit 163 which outputs an average value of the peak value detected by the peak hold circuit 161 and the peak value detected by the peak hold circuit 162.

The differential amplifier circuit AMP generates an control voltage 144 so as to reduce the difference between the target voltage VTGT and a detection voltage VPA corresponding to the average value of two peak values which have been generated by the averaging circuit 163. The configuration of other parts including the resonance circuit 130 of the electric power receiving device 9 is the same as that of the electric power receiving device 2 according to Embodiment 1.

According to this configuration, as is the case with the electric power receiving device 2 according to Embodiment 1, the resonance frequency is adjusted so as to keep the reception electric power from exceeding the target electric power level. Therefore, it is possible to restrict the reception electric power of the electric power receiving device 9, and to suppress the heat generation of the electric power receiving device 9. The reception electric power is detected in the earlier stage than the rectifier circuit 133; therefore, it is possible to improve the responsiveness of the control system (the control system after the reception electric power is detected until the impedance of the resonance circuit 130 is adjusted). By adopting the configuration in which each peak voltage at the node NDP and the node NDN is detected, it is possible to suppress the degradation of the detection accuracy in the input voltage detection unit 160, even when the waveform of the AC signals corresponding to the reception electric power generated at the node NDP and the node NDN is asymmetrical.

Embodiment 8

Figure 12:
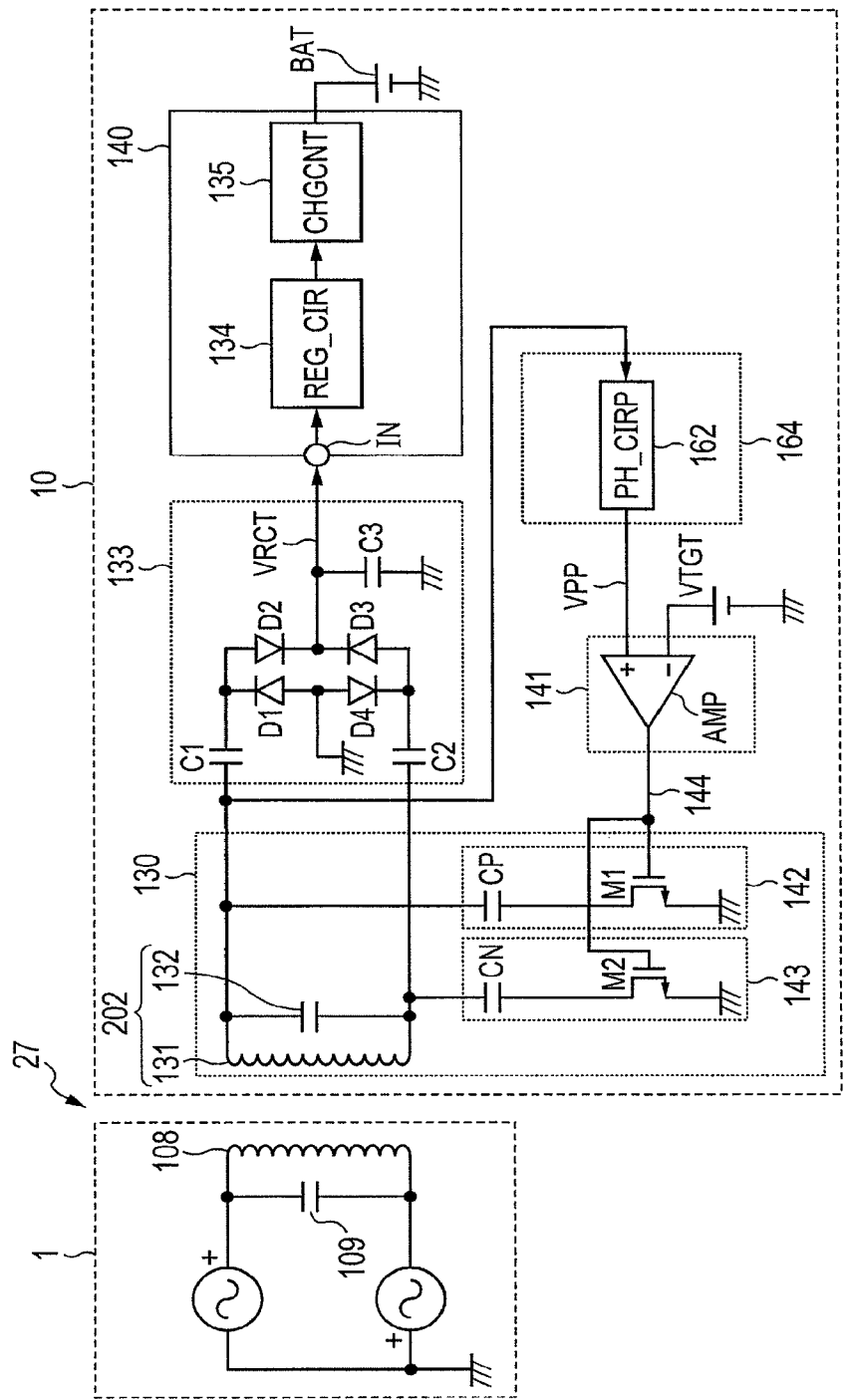
FIG. 12 is a drawing illustrating a non-contact power supply system including an electric power receiving device according to Embodiment 8.

FIG. 12 illustrates a non-contact power supply system including an electric power receiving device according to Embodiment 8.

An electric power receiving device 10 in a non-contact power supply system 27 according to Embodiment 8 is different from the electric power receiving device 11 according to Embodiment 7 in the point that the input voltage of one side of the rectifier circuit 133 is monitored to adjust the resonance frequency.

An input voltage detection unit 164 in the electric power receiving device 10 illustrated in the figure includes a peak hold circuit (PH_CIRP) 162 which detects a peak value of the input voltage on the positive side or the negative side of the rectifier circuit 133 (voltage at the node NDP or at the node NDN), for example. FIG. 12 illustrates the configuration in which the peak value at the node NDP is detected by the peak hold circuit 162; however, it is also preferable to adopt a configuration in which the peak value at the node NDN is detected.

The differential amplifier circuit AMP generates a control voltage 144 so as to reduce the difference of a detection voltage VPP corresponding to the peak value detected by the peak hold circuit 162 and the target voltage VTGT. The configuration of other parts including the resonance circuit 130 is the same as that of the electric power receiving device 2 according to Embodiment 1.

According to this configuration, as is the case with the electric power receiving device 9 according to Embodiment 7, the resonance frequency is adjusted so as to keep the reception electric power from exceeding the target electric power level. Therefore, it is possible to restrict the reception electric power of the electric power receiving device 10, and to suppress the heat generation of the electric power receiving device 10. According to the electric power receiving device 10, when the detection accuracy by means of the input voltage detection unit 164 is allowable, it is possible to reduce the number of components which are otherwise to be added. Therefore, it is possible to suppress the increase in cost of the electric power receiving device accompanied by enabling the adjustment of the resonance frequency.

Embodiment 9

Figure 13:
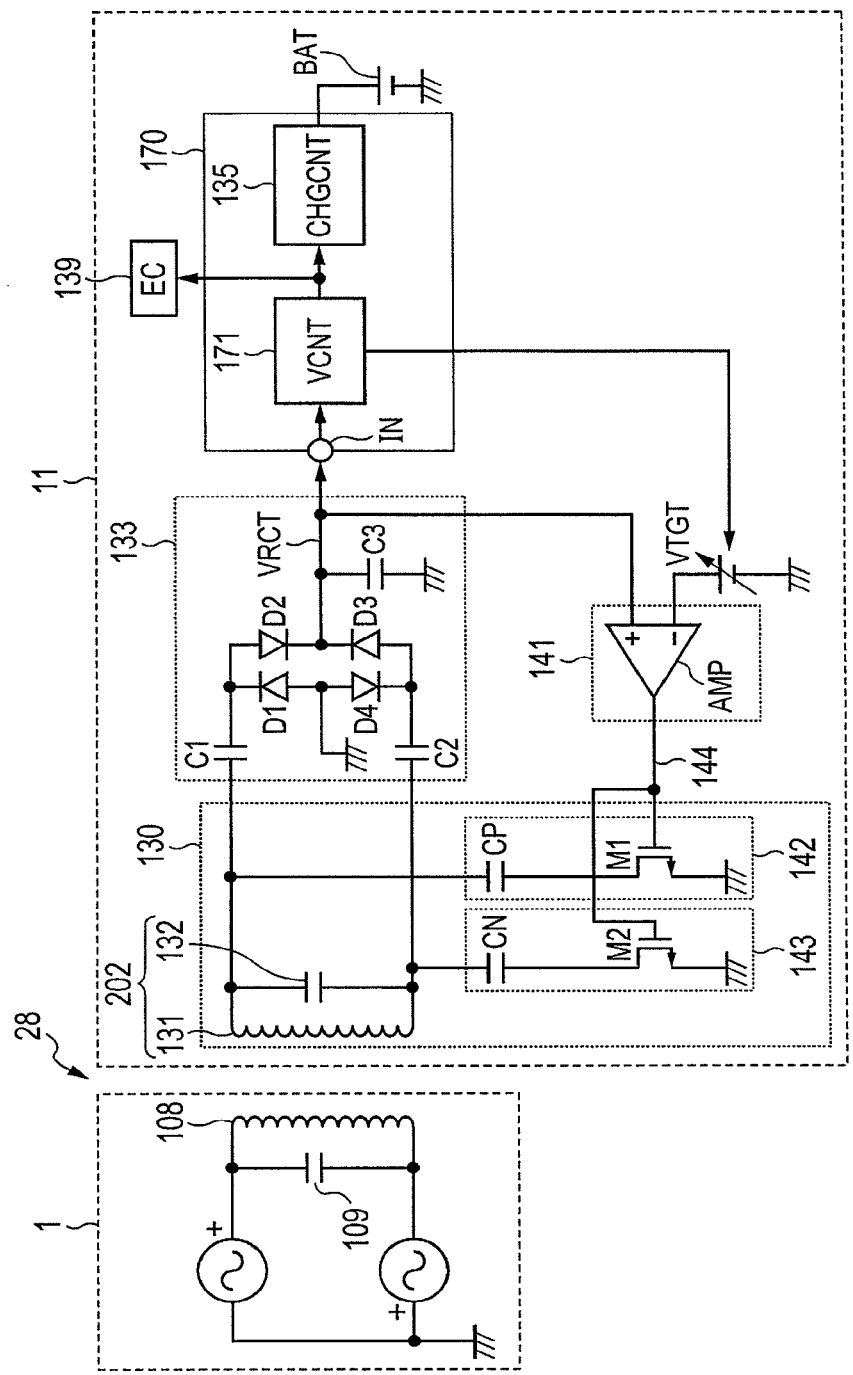
FIG. 13 is a drawing illustrating a non-contact power supply system including an electric power receiving device according to Embodiment 9.

FIG. 13 illustrates a non-contact power supply system including an electric power receiving device according to Embodiment 9.

An electric power receiving device 11 in a non-contact power supply system 28 according to Embodiment 9 is different from the electric power receiving device according to the other embodiments in the point that the target voltage VTGT supplied to the resonance frequency adjustment unit is variable.

As illustrated in FIG. 13, an electric power reception IC 170 in the electric power receiving device 11 includes a voltage control unit 171 in lieu of the power supply circuit 134. The voltage control unit 171 inputs the rectified voltage VRCT and supplies the voltage to the internal electronic circuit 139, the charging control circuit 135, etc., as the load circuits which are coupled in the latter stage, and at the same time, the voltage control unit 171 adjusts the target voltage VTGT so as to match the voltage to be supplied to the load circuits with the desired voltage. The adjustment of the target voltage VTGT is realized by, for example, controlling the above-described reference voltage generating circuit (not shown) provided in the electric power receiving device.

For example, when the voltage of 5V is to be supplied to the internal electronic circuit 139, the charging control circuit 135, etc., the voltage control unit 171 adjusts the target voltage VTGT so that the output voltage of the voltage control unit 171 may become 5V. Accordingly, assuming that the input-output voltage drop of the voltage control unit 171 can be ignored, the reception electric power is restricted so that the rectified voltage VRCT to be inputted to the voltage control unit 171 may become 5V, As described above, according to the electric power receiving device 11 according to Embodiment 9, the output voltage of the rectifier circuit 133 is adjusted, depending on the voltage level to be supplied to the load. Therefore, it is possible to generate a voltage necessary for the load, even if a DC-DC converter such as a regulator (the above-described power supply circuit 134, etc.) is not provided in the latter stage of the rectifier circuit 133. Therefore, if the requirement specification of the electric power receiving device is satisfied, it is possible to remove the existing DC-DC converter etc., contributing to the reduction of the circuit scale of the electric power receiving device.

Embodiment 10

In the present embodiment, the electric power receiving device provided with the function of controlling the reception electric power as illustrated in Embodiment 1 through Embodiment 9 is applied to a non-contact power supply system which is capable of performing wireless communications other than the NFC communications. An example of the configuration of the present system is illustrated in FIG. 14.

Figure 14:
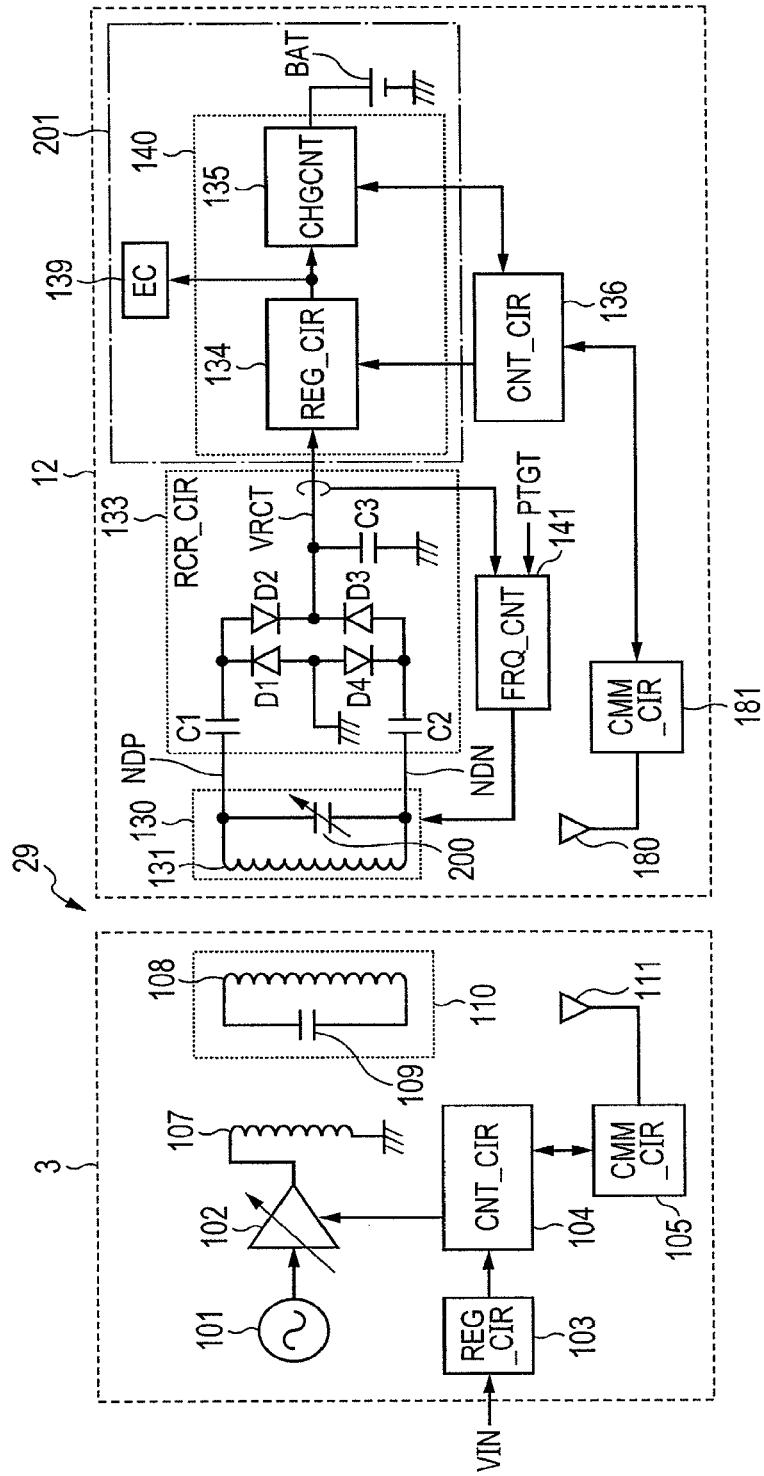
FIG. 14 is a drawing illustrating a non-contact power supply system including an electric power receiving device according to Embodiment 10.

FIG. 14 illustrates a non-contact power supply system including an electric power receiving device according to Embodiment 10.

An electric power receiving device 12 in a non-contact power supply system 29 illustrated in the figure is different from the electric power receiving device according to the other embodiments in the point that a communications antenna is provided separately from the resonance coil 131 to perform wireless communications with the electric power transmitting device.

In the non-contact power supply system 29, it is possible to perform data transmission/reception mutually between the electric power transmitting device 3 and the electric power receiving device 12, by the short distance radio communication. The short distance radio communication is wireless communications by a wireless LAN and Bluetooth (registered trademark), for example, using a frequency in GHz zone.

As illustrated in FIG. 14, the electric power transmitting device 3 includes a communications antenna 111 in lieu of the above-described communication coil antenna 106. The communication unit 105 performs wireless communications with the electric power receiving device 12 via the communications antenna 111. Other configurations are the same as those of the electric power transmitting device 1 according to Embodiment 1.

As illustrated in the figure, the electric power receiving device 12 includes a communication unit (CMM_CIR) 181 and a communications antenna 180 in lieu of the switching circuit 1370 and the communication control circuit 1371 described above. The communication unit 181 performs wireless communications with the electric power transmitting devices 3 via the communications antenna 180. Other configurations are the same as those of the electric power transmitting device according to Embodiment 1 through Embodiment 9. As the concrete configuration of the resonance frequency adjustment unit 141 and the resonance circuit 130, it is possible to apply various kinds of configurations illustrated in Embodiment 1 through Embodiment 9 (the differential amplifier circuit AMP, the comparator circuit CMP, the resonance circuits 130A-130E, etc.).

According to this configuration, as is the case with Embodiment 1 through Embodiment 9, it is possible not to receive an excessive electric power more than the electric power required by the electric power receiving device, and to suppress the heat generation of the electric power receiving device.

As described above, the invention accomplished by the present inventors has been concretely explained based on the embodiments. However, it cannot be overemphasized that the present invention is not restricted to the embodiments, and it can be changed variously in the range which does not deviate from the gist.

For example, in the configurations illustrated in Embodiment 1 through Embodiment 10, the output voltage VRCT or the input voltage (the voltage at the nodes NDP and NDN) of the rectifier circuit 133 is monitored. However, the configuration will not be restricted to the configuration illustrated above, as long as monitoring the reception electric power is possible. For example, it is also preferable to monitor the reception electric power by monitoring the output current or input current of the rectifier circuit 133, and to adjust the impedance of the resonance circuit 130 on the basis of the monitored result. It is also possible to employ a CM directional coupler, for example, as the detection circuit of the electric power amount.

The means for adjusting the resonance frequency of the resonance circuit 130 is not restricted to the configuration illustrated in Embodiment 1 through Embodiment 10; however, it is also possible to adopt various circuit configurations, as long as it is possible to change the resonance frequency of the resonance circuit 130.

The simple circuit configuration in which the resonant frequency regulation circuit 141 is configured with the differential amplifier circuit AMP or the comparator circuit CMP has been illustrated. However, the configuration will not be restricted to the one illustrated above, as long as it is possible to adjust the impedance of the resonance circuit 130. For example, in order to improve the stability and reliability of the control, it is also possible to add a phase compensation circuit to the differential amplifier circuit AMP, or to add various logic circuits to the comparator circuit CMP.

In the electric power receiving device 6 according to Embodiment 4, it is also preferable to adopt the configuration in which, in addition to the impedance adjustment circuits 151_1-151_n coupled to the node NDN, impedance adjustment circuits 151_1-151_n coupled to the node NDP are provided and on-off controlled by the corresponding comparator circuits. According to this configuration, as is the case with the electric power receiving device 1 according to Embodiment 1, it is possible to maintain the symmetry of the AC signals supplied to each of the node NDP and the node NDN.

In the electric power receiving device 7 according to Embodiment 5, the configuration in which the bias voltage of the PIN diode is controlled by means of the differential amplifier circuit AMP via the transistor M3 has been illustrated. However, it is also possible to use the comparator circuit CMP in lieu of the differential amplifier circuit AMP. In this case, it is also preferable to adopt a configuration in which plural comparator circuits CMP and plural impedance adjustment circuits 152 each including a PIN diode are provided and controlled as in the electric power receiving device 6 according to Embodiment 4.

Embodiment 1 through Embodiment 10 have illustrated the case where the function for controlling the reception electric power is applied to the electric power receiving device of the non-contact power supply system of the magnetic resonance type. However, it is also possible to apply the function to an electric power receiving device in a non-contact power supply system of the electromagnetic induction type. It is also possible to apply the function to a non-contact power supply system which is configured with the electric power transmitting device and the electric power receiving device, and which performs only the electric power transmission and reception, without the communication function. According to this configuration, it is possible to reduce the size of the electric power transmitting device and the electric power receiving device, due to the deletion of a circuit, an antenna, etc. for communications, while enhancing the reliability of the non-contact power transmission.

What is claimed is:

1. An electric power receiving device comprising:
a resonance circuit including a resonance capacitor and a resonance coil acting as a receiving antenna, the electric power receiving device being operable to receive electric power in a non-contact manner with the use of resonant coupling of the resonance circuit,
wherein, in receiving the electric power, the reception electric power received by the resonance circuit is monitored, and a resonance frequency of the resonance circuit is controlled to keep the reception electric power from exceeding a target electric power level,
wherein when the reception electric power is not exceeding the target electric power level, the impedance of the resonance circuit is adjusted so as to match the resonance frequency of the resonance circuit with an electric power transmission frequency, and
wherein when the reception electric power is exceeding the target electric power level, the impedance of the resonance circuit is adjusted so as to shift the resonance frequency away from the electric power transmission frequency,
the electric power receiving device further comprising:
a rectifier circuit operable to rectify an AC voltage corresponding to the electric power received by the resonance circuit to obtain a DC output voltage; and
an adjustment unit operable to monitor the output voltage of the rectifier circuit and to adjust impedance of the resonance circuit to keep the output voltage from exceeding a target voltage,
wherein the capacitance value of the resonance circuit is changed by the adjustment unit,
wherein the adjustment unit comprises:
a differential amplifier circuit operable to generate a control voltage so as to reduce a difference of the target voltage and the output voltage,
wherein the resonance circuit comprises:
a parallel resonance unit configured with the resonance coil and the resonance capacitor coupled in parallel; and
a first capacitor and a first variable resistance circuit coupled in series between one end of the parallel resonance unit and a reference node supplied with a fixed voltage, and
wherein the first variable resistance circuit changes a value of resistance on the basis of the control voltage.

2. The electric power receiving device according to claim 1,
wherein the resonance circuit further comprises:
a second capacitor and a second variable resistance circuit coupled in series between the other end of the parallel resonance unit and the reference node, and
wherein the second variable resistance circuit changes a value of resistance on the basis of the control voltage.

3. The electric power receiving device according to claim 2,
wherein the first variable resistance circuit and the second variable resistance circuit respectively include a transistor driven by the control voltage.

4. The electric power receiving device according to claim 1, further comprising:
a load circuit; and a voltage control unit operable to receive the output voltage of the rectifier circuit and to supply it to the load circuit coupled in the latter stage, wherein the voltage control unit adjusts the target voltage so as to match the voltage to be supplied to the load circuit with a desired voltage.

5. The electric power receiving device according to claim 1, wherein the resonance circuit comprises a PIN diode to which a variable bias voltage is applied by the adjustment unit.

6. The electric power receiving device according to claim 1, wherein the resonance circuit changes the inductance of the receiving coil.

7. The electric power receiving device according to claim 1, comprising:

an input voltage detection unit operable to detect the input voltage supplied to the rectifier circuit by the resonance circuit.

8. The electric power receiving device according to claim 7, wherein the rectifier circuit is a full wave rectifier circuit, wherein the input voltage detection unit comprises:

a first peak hold circuit operable to detect a peak value of a positive side input voltage of the rectifier circuit;

a second peak hold circuit operable to detect a peak value of a negative side input voltage of the rectifier circuit; and an averaging circuit operable to output an average value of the peak value detected by the first peak hold circuit and the peak value detected by the second peak hold circuit, and wherein the adjustment unit adjusts the impedance of the resonance circuit to keep the average value of the averaging circuit from exceeding the target voltage.

* * * * *